US012657584B2

(12) United States Patent (10) Patent No.: US 12,657,584 B2
Suzuki et al. (45) Date of Patent: Jun. 16, 2026

(54) DATA TRANSACTION SYSTEM

(71) Applicant: Plat'Home Co., Ltd., Tokyo (JP)

(72) Inventors: Tomoyasu Suzuki, Tokyo (JP); Toshiya Goto, Tokyo (JP); Daisuke Ogawa, Tokyo (JP)

(73) Assignee: Plat'Home Co., Ltd., Tokyo (JP)

( * ) Notice: Subject to any disclaimer, the term of this patent is extended or adjusted under 35 U.S.C. 154(b) by 485 days.

(21) Appl. No.: 17/416,406

(22) PCT Filed: Dec. 12, 2019

(86) PCT No.: PCT/JP2019/048742
§ 371 (c)(1),
(2) Date: Jun. 18, 2021

(87) PCT Pub. No.: WO2020/129815
PCT Pub. Date: Jun. 25, 2020

(65) Prior Publication Data
US 2022/0058647 A1 Feb. 24, 2022

(30) Foreign Application Priority Data
Dec. 20, 2018 (JP) ................................ 2018-238786

(51) Int. Cl.
*G06Q 20/40* (2012.01)
*G06F 21/64* (2013.01)
(52) U.S. Cl.
CPC ........... *G06Q 20/401* (2013.01); *G06F 21/64* (2013.01); *G06Q 2220/00* (2013.01)
(58) Field of Classification Search
None
See application file for complete search history.

(56) References Cited

U.S. PATENT DOCUMENTS 8,489,463 B2 * 7/2013 Sen ........................ G06Q 30/08
705/26.1
10,102,265 B1 * 10/2018 Madisetti ........... G06Q 20/3678
(Continued)

FOREIGN PATENT DOCUMENTS

CN 110099055 A 8/2019
JP 2018-018348 A 2/2018
(Continued)

OTHER PUBLICATIONS

K. R. Özyilmaz, M. Doan and A. Yurdakul, "IDMoB: IoT Data Marketplace on Blockchain," 2018 Crypto Valley Conference on Blockchain Technology (CVCBT), Zug, Switzerland, 2018, pp. 11-19, doi: 10.1109/CVCBT.2018.00007. (Year: 2018).*
(Continued)

*Primary Examiner* — Eduardo Castilho
(74) *Attorney, Agent, or Firm* — Studebaker Brackett PLLC

(57) ABSTRACT

This data transaction system is provided with: a data transport unit that is able to set a channel of data and deliver the data to a predetermined partner by control from outside; a data transaction unit that executes a transaction contract for the data; an acquisition unit that issues a selling offer of the data to the data transaction unit for the sake of a provider that provides the data; and a data broker that issues a buying offer of the data to the data transaction unit for the sake of a service provider that utilizes the data. The data transaction unit performs condition matching between the selling offer and the buying offer, and when both match, causes the data transport unit to set a channel for delivering the data from the data provider to the service provider.

8 Claims, 25 Drawing Sheets

(56) References Cited

U.S. PATENT DOCUMENTS

| | | | |
|---|---|---|---|
| 10,535,207 B1 | 1/2020 | Goluguri et al. | |
| 10,667,272 B2* | 5/2020 | Liu | H04L 1/0004 |
| 11,847,646 B2* | 12/2023 | Gorilovsky | G06Q 20/0655 |
| 2016/0260171 A1* | 9/2016 | Ford | G06Q 20/389 |
| 2017/0287090 A1 | 10/2017 | Hunn et al. | |
| 2017/0308596 A1 | 10/2017 | Chen et al. | |
| 2018/0039785 A1 | 2/2018 | Naqvi et al. | |
| 2018/0096412 A1 | 4/2018 | Scott-Nash et al. | |
| 2018/0139056 A1 | 5/2018 | Mai et al. | |
| 2018/0288022 A1* | 10/2018 | Madisetti | G06Q 20/3829 |
| 2018/0336515 A1 | 11/2018 | Mehring et al. | |
| 2018/0343126 A1 | 11/2018 | Fallah et al. | |
| 2019/0012662 A1* | 1/2019 | Krellenstein | G06Q 20/3827 |
| 2019/0013948 A1* | 1/2019 | Mercuri | G06Q 20/3827 |
| 2019/0036887 A1* | 1/2019 | Miller | G07C 9/20 |
| 2019/0050854 A1* | 2/2019 | Yang | G06Q 20/1235 |
| 2019/0137988 A1* | 5/2019 | Cella | G05B 19/41865 |
| 2019/0244306 A1* | 8/2019 | Kursun | G06F 16/137 |
| 2019/0349733 A1* | 11/2019 | Nolan | H04L 61/5069 |
| 2019/0361917 A1 | 11/2019 | Tran et al. | |
| 2020/0026785 A1* | 1/2020 | Patangia | H04L 9/0643 |
| 2020/0043007 A1 | 2/2020 | Simons | |
| 2020/0051081 A1* | 2/2020 | Valecha | G06Q 20/401 |
| 2020/0058007 A1* | 2/2020 | Karame | G06Q 20/123 |
| 2020/0128555 A1* | 4/2020 | Kreiner | H04W 72/542 |
| 2020/0143471 A1* | 5/2020 | Jackson | G06Q 20/3678 |
| 2020/0167770 A1* | 5/2020 | Kurian | G06Q 20/065 |
| 2021/0004270 A1* | 1/2021 | Singh | G06F 9/5077 |
| 2021/0248156 A1 | 8/2021 | Egami et al. | |
| 2022/0058647 A1 | 2/2022 | Suzuki et al. | |
| 2022/0198562 A1 | 6/2022 | Cella et al. | |
| 2024/0078574 A1 | 3/2024 | Doran et al. | |

FOREIGN PATENT DOCUMENTS

| | | |
|---|---|---|
| JP | 2018-081464 A | 5/2018 |
| JP | 6501029 B1 | 4/2019 |
| JP | 6694048 B1 | 5/2020 |
| JP | 2020-188446 A | 11/2020 |

OTHER PUBLICATIONS

C. Jiang, L. Gao, L. Duan and J. Huang, "Scalable Mobile Crowdsensing via Peer-to-Peer Data Sharing," in IEEE Transactions on Mobile Computing, vol. 17, No. 4, pp. 898-912, 1, 2018, doi: 10.1109/TMC.2017.2743718. (Year: 2018).*

L. C. C. De Biase, P. C. Calcina-Ccori, G. Fedrecheski, G. M. Duarte, P. S. S. Rangel and M. K. Zuffo, "Swarm Economy: A Model for Transactions in a Distributed and Organic IoT Platform," https://ieeexplore.ieee.org/document/8572758, Print Publication Date: Dec. 10, 2018 (Year: 2018).*

K. Özyilmaz, and A. Yurdakul, "Designing a blockchain-based IoT infrastructure with Ethereum, Swarm and LoRa," https://www.researchgate.net/publication/327790416_Designing_a_blockchain-based_IoT_infrastructure_with_Ethereum_Swarm_and_LoRa (Year: 2018).*

L. C. C. De Biase, P. C. C. Ccori, G. Fedrecheski, D. Navarro, R. Y. Lino and M. K. Zuffo, "Swarm Minimum Broker: an approach to deal with the Internet of Things heterogeneity," 2018 Global Internet of Things Summit (GIoTS), Bilbao, Spain, 2018, pp. 1-6, doi: 10.1109/GIOTS.2018.8534433. (Year: 2018).* lhartikk.github.io, "NaïveCoin," retrieved from https://web.archive.org/web/20181112211128/http://lhartikk.github.io:80/ on Nov. 12, 2018 and before. (Year: 2018).*

L. C. C. De Biase, P. C. Calcina-Ccori, G. Fedrecheski, G. M. Duarte, P. S. S. Rangel and M. K. Zuffo, "Swarm Economy: A Model for Transactions in a Distributed and Organic IoT Platform," HTML version extracted from https://ieeexplore.ieee.org/document/8572758 "Date of Publication: Dec. 11, 2018" (Year: 2018).*

B. Yu, J. Wright, S. Nepal, L. Zhu, J. Liu and R. Ranjan, "IoTChain: Establishing Trust in the Internet of Things Ecosystem Using Blockchain," in IEEE Cloud Computing, vol. 5, 2018, No. 4, pp. 12-23, Jul./Aug. 2018, doi: 10.1109/MCC.2018.043221010. (Year: 2018).*

G. Papadodimas, G. Palaiokrasas, A. Litke and T. Varvarigou, "Implementation of smart contracts for blockchain based IoT applications," 2018 9th International Conference on the Network of the Future (NOF), Poznan, Poland, 2018, pp. 60-67, doi: 10.1109/NOF.2018.8597718 (Year: 2018).*

M. Conoscenti, A. Vetrò and J. C. De Martin, "Blockchain for the Internet of Things: A systematic literature review," 2016 IEEE/ACS 13th International Conference of Computer Systems and Applications (AICCSA), Agadir, Morocco, 2016, pp. 1-6, doi: 10.1109/AICCSA.2016.7945805 (Year: 2016).*

K. Christidis and M. Devetsikiotis, "Blockchains and Smart Contracts for the Internet of Things," in IEEE Access, vol. 4, pp. 2292-2303, 2016, doi: 10.1109/ACCESS.2016.2566339. (Year: 2016).*

Y. Zhang and J. Wen, "An IoT electric business model based on the protocol of bitcoin," 2015 18th International Conference on Intelligence in Next Generation Networks, Paris, France, 2015, pp. 184-191, doi: 10.1109/ICIN.2015.7073830 (Year: 2015).*

Dominic Wörner and Thomas von Bomhard, "When your sensor earns money: exchanging data for cash with Bitcoin," In (UbiComp '14 Adjunct), 2014, 295-298. https://doi.org/10.1145/2638728.2638786 (Year: 2014).*

Furuichi, Tetsuo et al.; "Proposal of IoT System with Smart Contract"; IPSJ SIG Technical Report; May 31, 2018; pp. 1-8; vol. 2018-CDS-22, No. 6.

"Hyperledger Fabric Docs", [online], Mar. 18, 2018, [retrieved on Jun. 12, 2019], Internet<URL:https://web.archive.org/web/20180318052829/https://hyperledger-fabric.readthedocs.io/en/release-1.0/channels.html>, entire text, all drawings.

Yoshihama, Sachiko et al.; "Protection of Integrity and Privacy on Distributed Ledger Technologies"; Proceedings of Computer Security Symposium 2017; Oct. 23-25, 2017; pp. 680-687; CD-ROM.

Ramachandran, Gowri Sankar et al.; "Blockchain for the IoT: Opportunities and Challenges"; May 8, 2018; arXiv:1805.02818vl [cs.DC].

An Office Action; "Notice of Reasons for Refusal," mailed by the Japanese Patent Office on Sep. 3, 2019, which corresponds to Japanese Patent Application No. 2018-238786 and is related to U.S. Appl. No. 17/416,406 with English language translation.

Crypto Crowd Japan, DECOIN.IO, "Always evolving DECO IN Exchange now!" Nov. 5, 2019 (accession date), No. 20, pp. 12-13, ISSN 2434-2211, p. 13, left column, lines 1-9, Published on Jan. 1, 2019.

Chuanwen Dong et al., "From the Digital Internet to the Physical Internet: A Conceptual Framework with a Stylized Network Model" Logistics Platform, Logi biz, vol. 20, No. 2, pp. 37-43, p. 39, table 1, Published on May 1, 2020.

International Search Report issued in PCT/JP2021/021070; mailed Jul. 20, 2021.

Georgios Papadodimas et al., "Implementation of Smart Contracts for Blockchain Based IoT Applications", 2018 9th International Conference on the Network of the Future (NOF), IEEE, Nov. 19, 2018, pp. 60-67, XP033490496.

Yu Zhang et al., "An IoT Electric Business Model Based on the Protocol of Bitcoin," 2015 18th International Conference on Intelligence in Next Generation Networks, IEEE, Feb. 17, 2015, pp. 184-191, XP032758446.

Dominic Wörner et al., "When Your Sensor Earns Money", Pervasive and Ubiquitous Computing, ACM, 2 Penn Plaza, Suite 701 New York NY 10121-0701 USA, Sep. 13, 2014, pp. 295-298, XP058055434.

Wood Gavin, "Ethereum: A Secure Decentralised Generalised Transaction Ledger, EIP-150 Revision," Jan. 1, 2014, pp. 1-32, XP055787779, URL: http://gavwood.com/Paper.pdf [retrieved on Mar. 19, 2021].

Andreas M. Antonopoulos et al., "Mastering Ethereum," Mastering Ethereum : Building Smart Contracts and DApps, Jan. 1, 2018, XP055880605, ISBN: 978-1-4919-7194-9, URL:https://dl.ebooksworld.ir/motoman/Mastering_Ethereum_Andreas.M.Antonopoulos.www.EBooksWorld.ir.pdf [retrieved on Jan. 18, 2022].

(56) References Cited

OTHER PUBLICATIONS

Konstantinos Christidis et al., "Blockchains and Smart Contracts for the Internet of Things", IEEE Access, Sep. 13, 2014, pp. 2292-2302, vol. 4, XP011613134, DOI: 10.1109/ACCESS.2016.2566339 [retrieved on Jun. 3, 2016].

Extended European Search Report issued in EP Patent Application No. 21816975.3, mailed on Oct. 13, 2023.

An Office Action mailed by the United States Patent and Trademark Office on Jul. 18, 2024, which corresponds to U.S. Appl. No. 18/000,484.

An Office Action mailed by the United States Patent and Trademark Office on Feb. 13, 2025, which corresponds to U.S. Appl. No. 18/000,484.

An Office Action; mailed by the China National Intellectual Property Administration of the People's Republic of China on Apr. 1, 2026, which corresponds to Chinese Patent Application No. 202180039167.7.

* cited by examiner

FIG . 1

DATA DISTRIBUTION TYPE PF

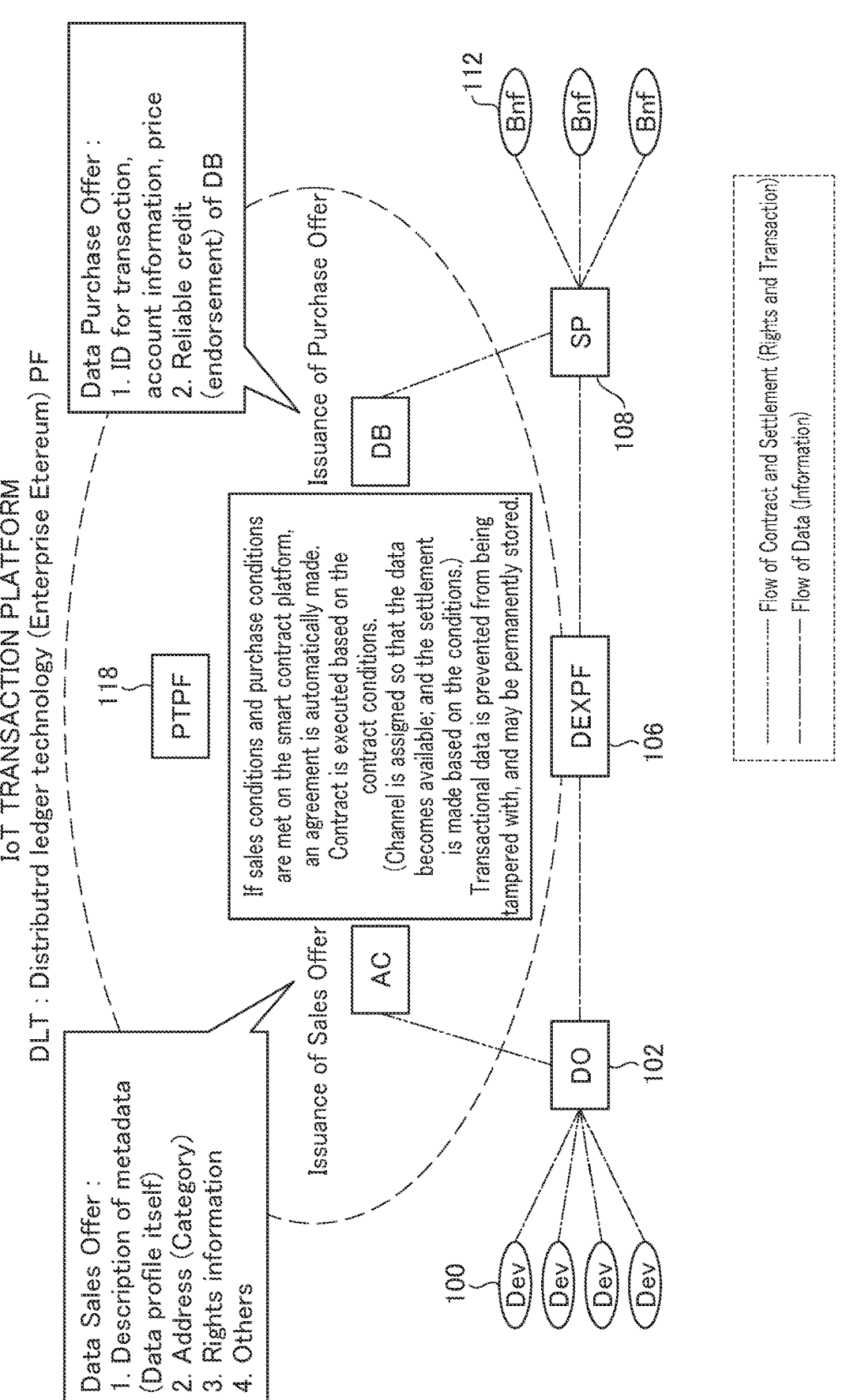

IoT TRANSACTION PLATFORM

DLT : Distributrd ledger technology (Enterprise Etereum) PF

Data Purchase Offer :
1. ID for transaction, account information, price
2. Reliable credit (endorsement) of DB Issuance of Purchase Offer Data Sales Offer :
1. Description of metadata (Data profile itself)
2. Address (Category)
3. Rights information
4. Others Issuance of Sales Offer If sales conditions and purchase conditions are met on the smart contract platform, an agreement is automatically made. Contract is executed based on the contract conditions.
(Channel is assigned so that the data becomes available, and the settlement is made based on the conditions.)
Transactional data is prevented from being tampered with, and may be permanently stored.

PTPF   118

AC

DB

SP   108

DO   102

DEXPF   106

Bnf   112
Bnf
Bnf

Dev   100
Dev
Dev
Dev

———— Flow of Contract and Settlement (Rights and Transaction)
——— Flow of Data (Information)

FIG. 8

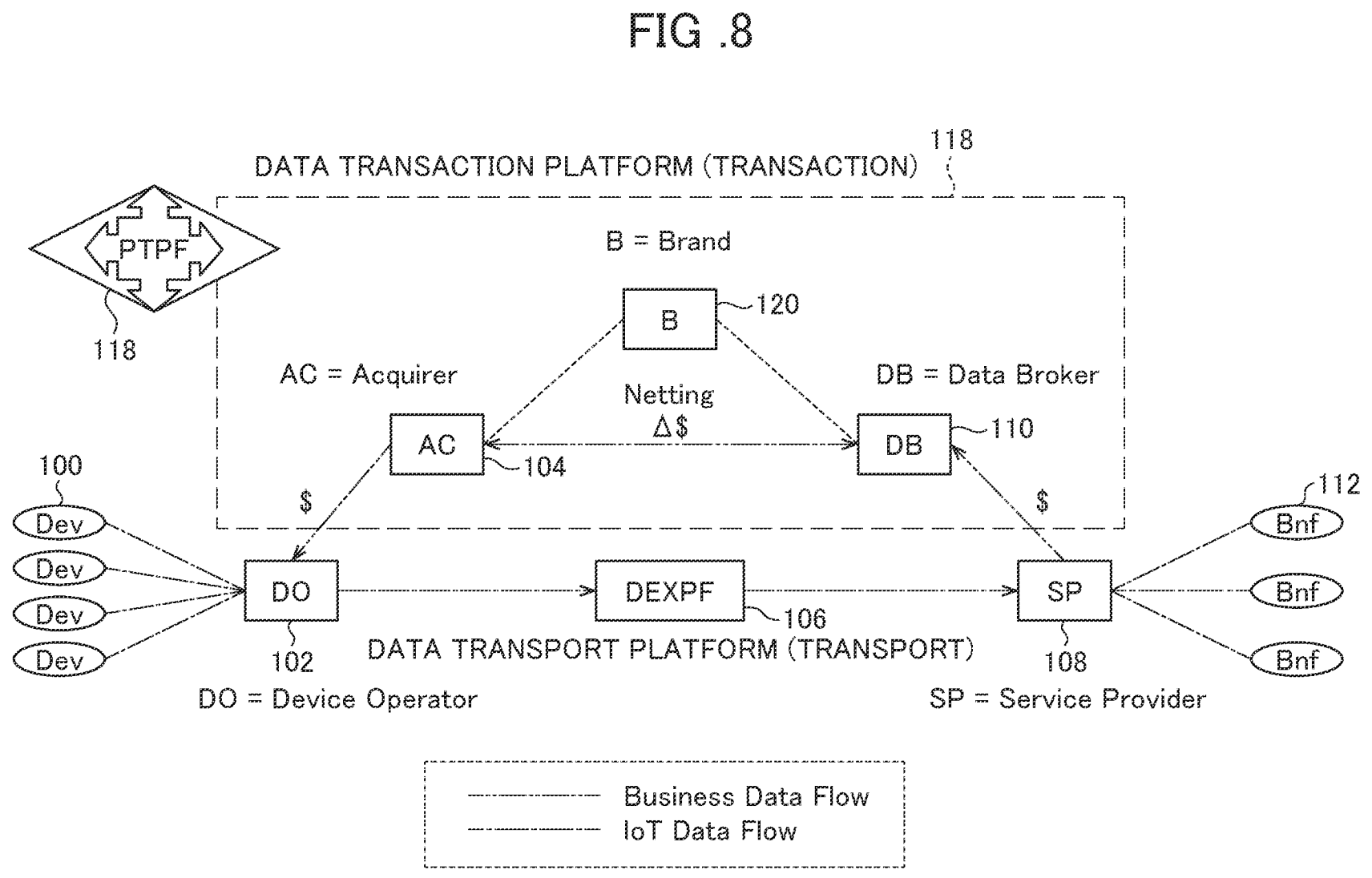

DATA TRANSACTION PLATFORM (TRANSACTION)

118

DB = Data Broker

B = Brand

120

B

Netting
△$

110

DB

104

AC $ $

SP

108

PTPF

118

DO

102

$

DEXPF

106

DATA TRANSPORT PLATFORM (TRANSPORT)

AC = Acquirer

100

Dev
Dev
Dev
Dev

Bnf
Bnf
Bnf

112

SP = Service Provider

DO = Device Operator

Business Data Flow
IoT Data Flow

Figure 19:
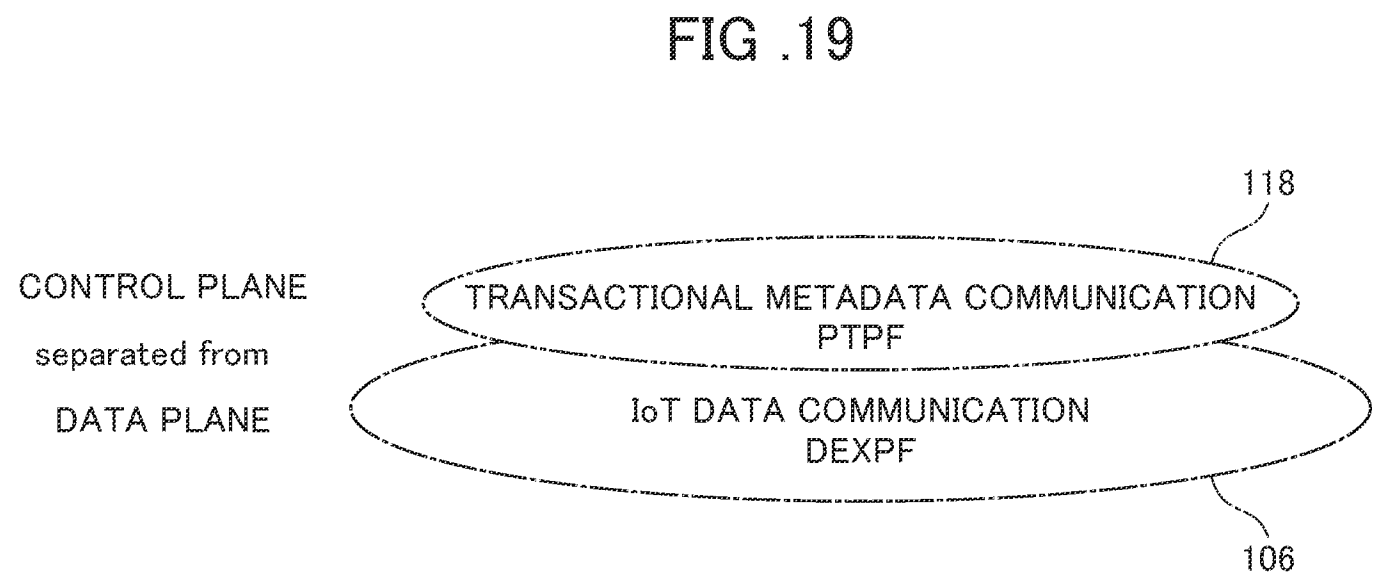

TRANSACTIONAL METADATA COMMUNICATION
PTPF

106

IoT DATA COMMUNICATION
DEXPF

CONTROL PLANE
separated from
DATA PLANE

COMMUNICATION OF METADATA INCLUDING TRANSACTION
PTPF

106

IoT DATA COMMUNICATION
DEXPF

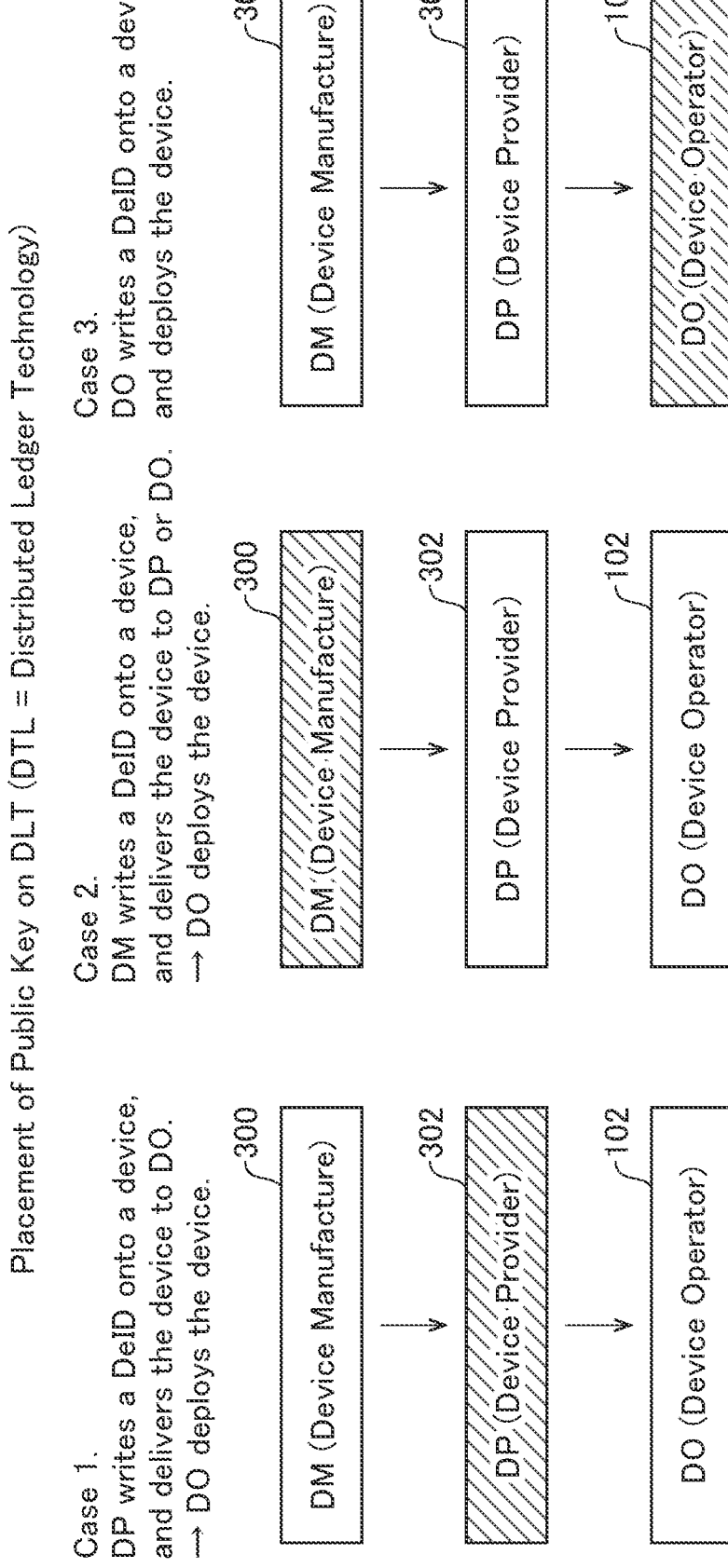

Placement of Public Key on DLT (DTL = Distributed Ledger Technology)

Case 1.
DP writes a DeID onto a device, and delivers the device to DO.
→ DO deploys the device.

Case 2.
DM writes a DeID onto a device, and delivers the device to DP or DO.
→ DO deploys the device.

Case 3.
DO writes a DeID onto a device, and deploys the device.

DM (Device Manufacture)    300
DP (Device Provider)    302
DO (Device Operator)    102

FIG .25

DATA ACCUMULATION TYPE PF

DATA TRANSACTION SYSTEM

TECHNICAL FIELD

The present invention relates to a data transaction system for transactions of data. In particular, the present invention relates to a data transaction system that enables a process from a contract to transaction of data to be conducted smoothly.

BACKGROUND ART (1) Development in Field of IoT

Recently, the IoT, which stands for the Internet of Things, has been widely used. To enable a user on the general Internet to use data acquired by a sensor or the like on the IoT, a scheme in which the data is temporarily accumulated on a server and the user on the general Internet accesses the sever to use the data is employed in many cases.

FIG. 25 is a conceptual diagram illustrating a conventional IoT platform. This platform is referred to as a data accumulation type platform (hereinafter, the "platform" is abbreviated as "PF"). As illustrated in FIG. 25, devices 14 for acquiring data supply the data to the PF 10 via gateways (hereinafter, the "gateway" is abbreviated as "GW"). The conventional PF 10 includes a storage (storage device), and can accumulate the data. After having been temporarily accumulated, the data is provided to various parties. The GWs 12 are used for connection between a network of the devices 14 and the Internet. The data accumulation type PF illustrated in FIG. 25 is also called a data silo type (warehouse type) PF. Conventionally, the data accumulation type PFs have been used for utilization of the IoT in many cases.

The data accumulation type IoT platform has the following characteristics:

The PF holds data (allows the data to be used),

The PF is of an occupancy type (stock type), and

The PF has a single-domain architecture.

However, in recent years, the amount of data handled by way of the IoT has become enormous. A small amount of data, such as hourly-measured temperature data, is sometimes handled through the IoT. However, in many cases, a large amount of data, such as data of a monitoring camera, needs to be utilized through the IoT. There is no known efficient scheme for delivering such a large amount of data in real time.

(2) Automatic Execution of Transactional Contract (Smart Contract)

Recently, frameworks of smart contract, in which various transactions are executed automatically, have been utilized. In these frameworks, it has been broadly proposed to use technologies that automatically execute contracts while ensuring reliability, such as a distributed ledger technology. In many of the conventional frameworks of smart contract, the so-called blockchain technology is employed. However, it is difficult to use the conventional frameworks of smart contract for IoT data contracts because of the enormous amount of data handled through the IoT, as described above.

For example, Patent Document 1 cited below discloses a scheme in which a blockchain application is started by an IoT gateway or the like. The blockchain application then starts a distributed file sharing application, and performs, for example, registration of an information file in a distributed file sharing network. According to this scheme, the use of the blockchain application is considered to ensure uniqueness of the file contents.

Patent Document 1: Japanese Unexamined Patent Application, Publication No. 2018-81464

DISCLOSURE OF THE INVENTION

Problems to be Solved by the Invention

As mentioned in (1) above, the conventional data accumulation type PF provides a limited capability of coping with a large amount of IoT data. However, there is no known efficient scheme for solving this problem. Therefore, there is an increasing demand for a scheme that efficiently transports a large amount of IoT data. Further, as mentioned in (2) above, the scheme in which transactions are managed with the distributed ledger has recently been used widely and increasingly. However, since the scheme of the distributed ledger is based on a scheme for constructing the so-called blockchain, it is theoretically difficult for the scheme of the distributed ledger to handle a large amount of data. Accordingly, it is considered practically difficult to apply the scheme of the distributed ledger to the transactions in the IoT field. There is no known effective scheme for solving this problem. Therefore, there is an increasing demand for a scheme for managing a large amount of IoT data with the distributed ledger.

In view of the foregoing circumstances, an object of the present invention is to achieve a scheme enabling smooth distribution of the IoT data. Another object of the present invention is to achieve a scheme for managing IoT data transactions with the distributed ledger, while employing the scheme for smooth data distribution.

Means for Solving the Problems

A data transaction system (e.g., a PtDX 116 to be described later) according to the present invention includes: a data transport unit (e.g., a DEXPF 106 to be described later) configured to set a data channel in response to external control, and capable of transporting data to a predetermined address; a data transaction unit (e.g., a PTPF 118 to be described later) configured to execute a data transaction contract; an acquisition unit (e.g., an AC 104 to be described later) configured to issue a data sales offer to the data transaction unit, on behalf of an offeror (e.g., a DO 102 to be described later) that intends to offer data; and a data broker (e.g., a DB 110 to be described later) configured to issue a data purchase offer to the data transaction unit, on behalf of a service provider (e.g., a SP 108 to be described later) that intends to use the data. The data transaction unit performs condition matching between the data sales offer and the data purchase offer. Upon a positive result of the condition matching, the data transaction unit causes the data transport unit to set the data channel through which the data is transported from the offeror to the service provider.

The data transport unit may be a data distribution type platform (e.g., a data distribution type PF illustrated in FIG. 1 to be described later) that is not intended for data accumulation.

The data transaction unit may use a distributed ledger to ensure integrity of the data transaction contract and to manage the data transaction contract.

The distributed ledger may use a blockchain (e.g., a blockchain 200 to be described later).

The distributed ledger may use a public blockchain (e.g., a blockchain 200 to be described later).

A public key associated with a device (e.g., a device 10 to be described later) for obtaining the data offered by the offeror may be stored on the blockchain.

The data transaction unit may be constructed using a system of Ethereum.

The data transaction system may further include a subroutine unit (e.g., subroutines 202*n* to 202*m* to be described later) configured to process output data of the data transport unit and to supply the processed output data to an input of the data transport unit.

In the data transaction unit, the acquisition unit and the data broker may make settlement in a virtual currency or a crypto currency.

The data may be IoT data, and the offeror may offer the IoT data.

The data transaction system may include two or more data transaction systems described above, and an other data transaction unit connected to the two or more data transaction units included in the two or more data transaction systems, the other data transaction unit functioning as an upper main data transaction unit (e.g., a main PTPF 118*m* to be described later) for the two or more data transaction units.

Effects of the Invention

The present invention enables smooth distribution of the IoT data. Further, the present invention makes it possible to implement the so-called smart contract on the IoT.

BRIEF DESCRIPTION OF THE DRAWINGS

FIG. 1 is a diagram illustrating principles of a PtDX according to an embodiment;

FIG. 3 illustrates a configuration of the PtDX according to the embodiment and a peripheral configuration thereof;

FIG. 4 illustrates operations taking place in a specific transaction according to the embodiment;

FIG. 8 is a diagram illustrating a case where netting is performed;

FIG. 11 is a diagram illustrating a case where three ACs 104 are present;

FIG. 13 is a diagram illustrating only the components connected to a DEXPF 106;

FIG. 14 illustrates a configuration in which two DOs 102 and two SPs 108 are present;

FIG. 15 is a diagram illustrating the PTPF 118 performing condition matching;

FIG. 16 is a diagram illustrating the PTPF 118 issuing a channel ID;

FIG. 17 is a diagram illustrating the DEXPF 106 starting data distribution, following the setting of the channel ID;

FIG. 18 is a diagram illustrating settlement being made between the AC 104 and the DB 110;

FIG. 19 is a conceptual diagram illustrating a configuration in which a data plane (high-speed path) for transporting IoT data is separated from a control plane (low-speed path) for metadata including a transaction;

FIG. 20 is a conceptual diagram illustrating a configuration in which the metadata of the control plane is built in a public domain of a blockchain;

FIG. 21 is a conceptual diagram illustrating a configuration in which recursive processing is enabled by placing data outlets into subroutines and causing the subroutines to process the data, and by inputting the processed data as input data into the DEXPF 106;

FIG. 22 is a diagram illustrating a configuration in which a main PTPF network 118*m* has a plurality of brand domains arranged thereunder;

FIG. 23 is a conceptual diagram illustrating cases where a public key associated with a DeID (device ID) is placed on a blockchain;

FIG. 25 is a diagram illustrating a principle of a data silo type (warehouse type) IoT platform as a conventional general IoT platform.

PREFERRED MODE FOR CARRYING OUT THE INVENTION

An embodiment of the present invention will be described with reference to the drawings.

1. IoT Platform to Employ

Figure 1:
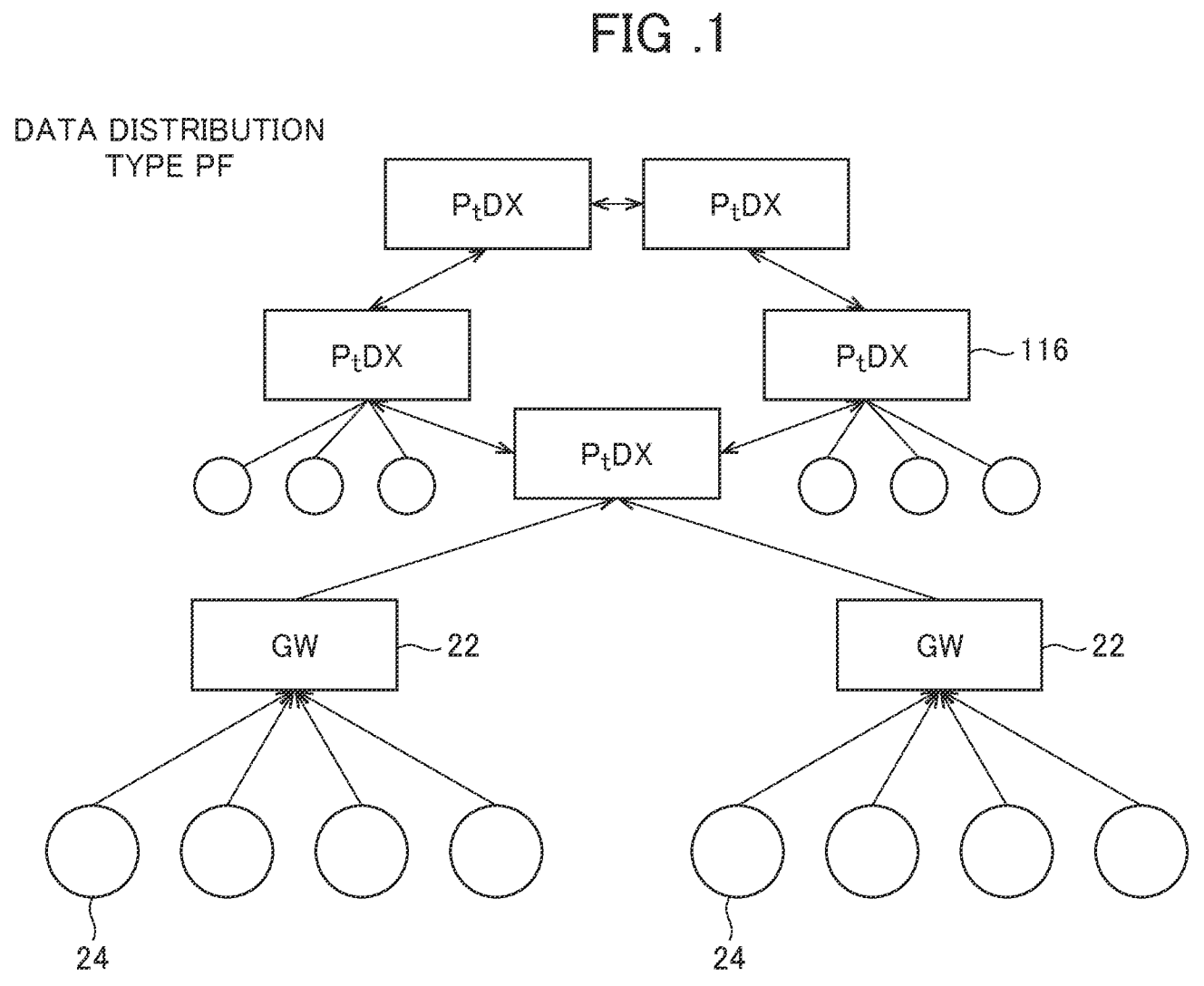

FIG. 1 is a schematic diagram illustrating a principle of an IoT platform of a PtDX 116, which is a characteristic IoT platform to be described in the present embodiment. This diagram is contrasted with FIG. 25, which illustrates the conventional IoT platform. As illustrated in FIG. 1, data of devices 24 is distributed through gateways 22 into the network of the PtDXs 116. This is called a data distribution type PF (platform).

The data distribution type PF has the following characteristics:

The PF does not hold any data,

The PF is of a shared type (flow type), and

The PF has a cross-domain architecture.

Figure 25:
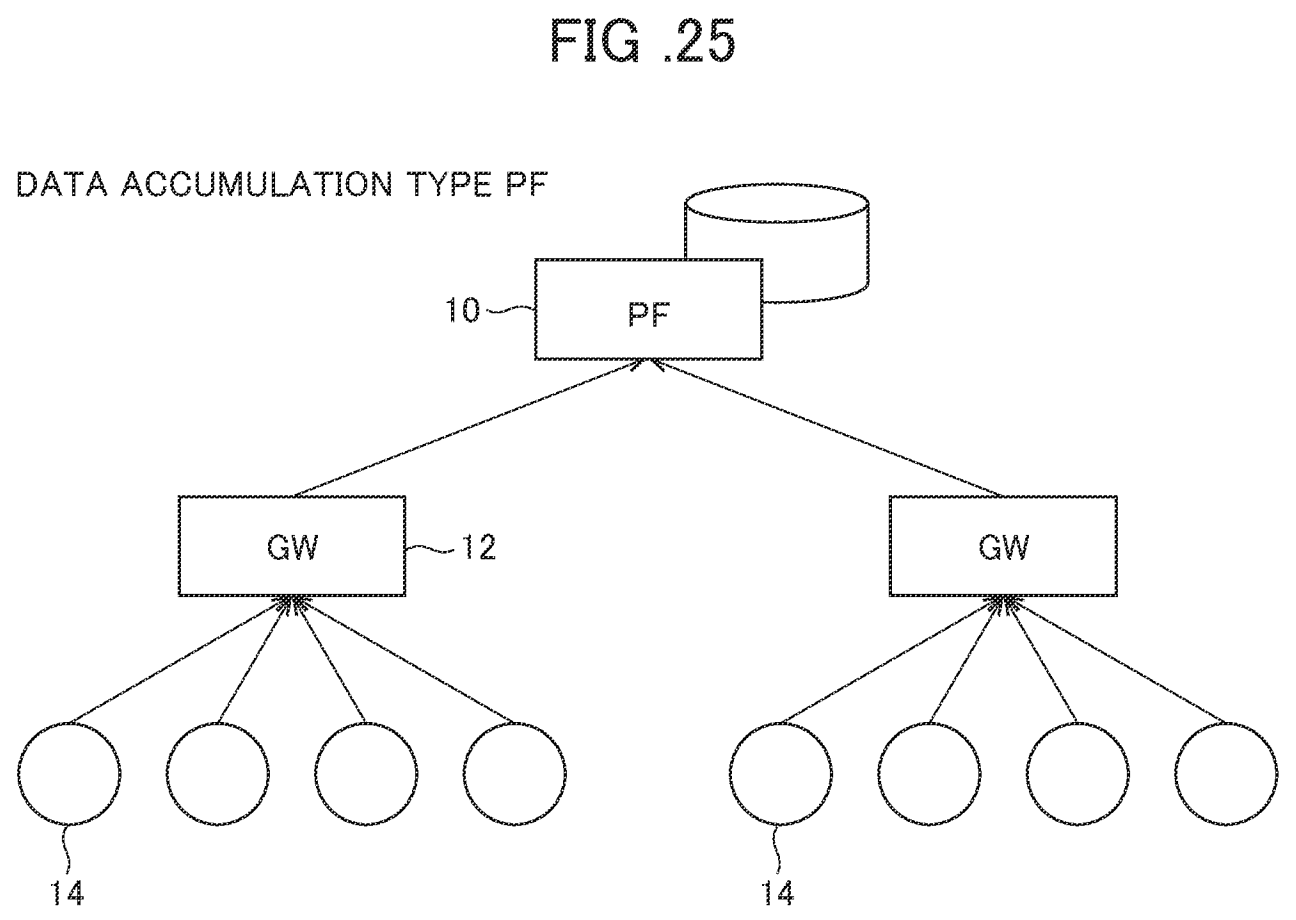

The data accumulation type PF described with reference to FIG. 25 has the following characteristics:

The PF holds data (allows the data to be used),

The PF is of the occupancy type (stock type), and

The PF has the single-domain architecture.

As can be seen, the former and latter PFs significantly differ from each other.

2. Role of PtDX

In the present embodiment, a scheme with the following characteristics will be described.

(1) Regarding the data distribution, a DEXPF, which is a new IoT PF proposed in the present embodiment, is used; and (2) Regarding the data transaction and provision of a service layer, a transactional platform called PTPF is used. This scheme is referred to as the PtDX 116.

PtDX stands for Pt Data Exchange, where Pt is a unit of a virtual currency. In the present embodiment, a transaction is realized which is characterized in that a price can be paid in a virtual currency. For these reasons, the present inventors refer to this scheme as the PtDX.

Figure 2:
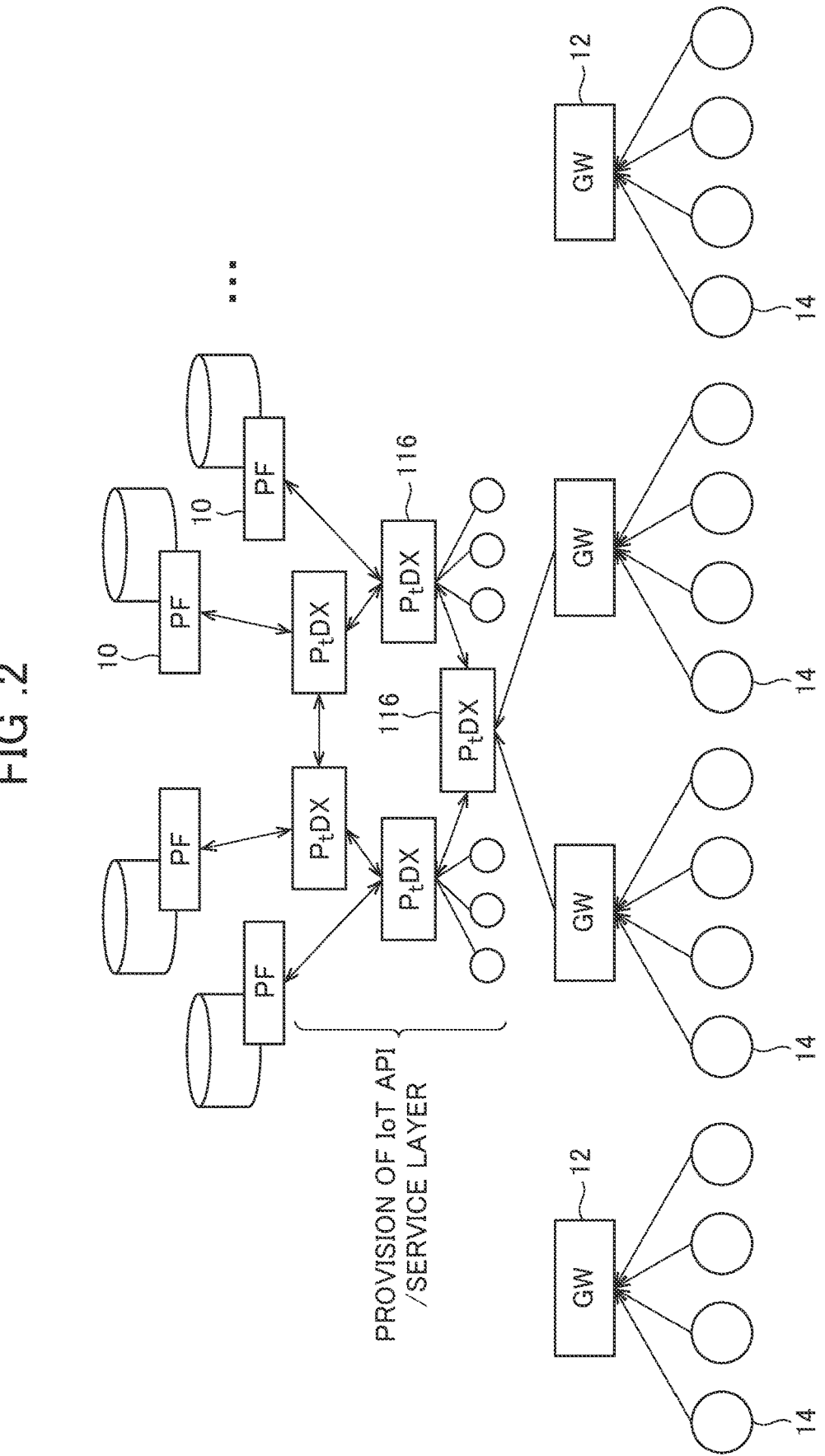
FIG. 2 is a diagram illustrating a service including an IoT platform provided by the PtDXs according to the embodiment, the PtDXs being connected to other platforms.

To be brief, a role of the PtDX 116 is to provide an API/service layer to the IoT. The PtDX 116 provides, to the PFs and service platforms, API-access services directed to an IoT device layer. As a result, each IoT device can be flexibly connected to various PFs and services. The principles of the PtDX 116 having this role are illustrated in FIG. 2. As illustrated in FIG. 2, the data of devices 14 is supplied through GWs 12 to a network of the PtDXs 116. Each PF 10 can receive the IoT data via the network of the PtDXs 116. That is, the PtDX 116 provides an API/service layer directed to the IoT. The PtDX 116 is an IoT data transport-transaction platform, and is a general-purpose/information business platform capable of conducting secure and high-speed transport and transaction of IoT data. The PtDX 116 corresponds to a preferred example of a data transaction system described in the claims.

The PtDX 116 has the following characteristics appreciated by a user. The PtDX 116 is characterized in being of the cross-domain type. That is, the PtDX 116 is a platform enabling transactions across all the domains, all the regions, and all the tiers (cloud, edge, Things) of the IoT.

Business-Related Characteristics

The PtDX 116 is characterized in that it enables business to be conducted on the platform. In other words, the PtDX 116 is a platform that enables (a) conclusion, execution, and management of contracts, and associated settlement, (b) data exchanges, and (c) management of data ownership.

3. Technical Characteristics of PtDX

The PtDX is an information platform that provides IoT data exchanges, transactions, and associated settlement, and has the following technical characteristics.

(1) Distributed Ledger Technology: The PtDX uses the distributed ledger technology (DLT). The PtDX issues tokens for use of the PFs, thereby enabling distribution and transactions of data.

(2) Ultra High Speed: The PtDX can perform data communication at an ultra-high speed since the PtDX uses the DEXPF. The PTPF implements data transactions, settlement, and rights control by assigning channel IDs. The PTPF can deal with an extremely large volume of traffic.

(3) Scale: The PtDX can support all of Global, cloud, edge, and Things.

(4) Security: The PtDX can ensure security and management on an end-to-end basis and on a center-to-end basis.

(5) Integrity: The PtDX can ensure the integrity of transaction records. The PtDX can ensure complete integrity of data of record/IoT transaction and can manage the same.

(6) Ownership Control: The PtDX can manage the use authority of data, based on the rights from the data origin to the respective flow stages (DLT/Smart Contract).

(7) Cross-Domain: The PtDX can support cross-platforms in heterogeneous domains. The PtDX can also function as a platform of a platform. This is a so-called inter platform function.

4. Role of PtDX

The PtDX plays important industrial roles after the information industrial revolution. The roles of the PtDX will be described in comparison with the previous industrial forms. Main objects in the previous economic system were materials and energy. In contrast, the PtDX is directed to information as the object. Currencies used in the previous economic system were money (shells, gold, and silver) and bills (banknotes). In contrast, the PtDX treats virtual currencies/ tokens (crypto currencies) as the currencies. The ledgers used in the previous economic system were the paper ledgers and databases (DBs). In contrast, the PtDX uses the distributed ledger technology (DLT) as the ledger.

5. Configuration of PtDX

Figure 3:
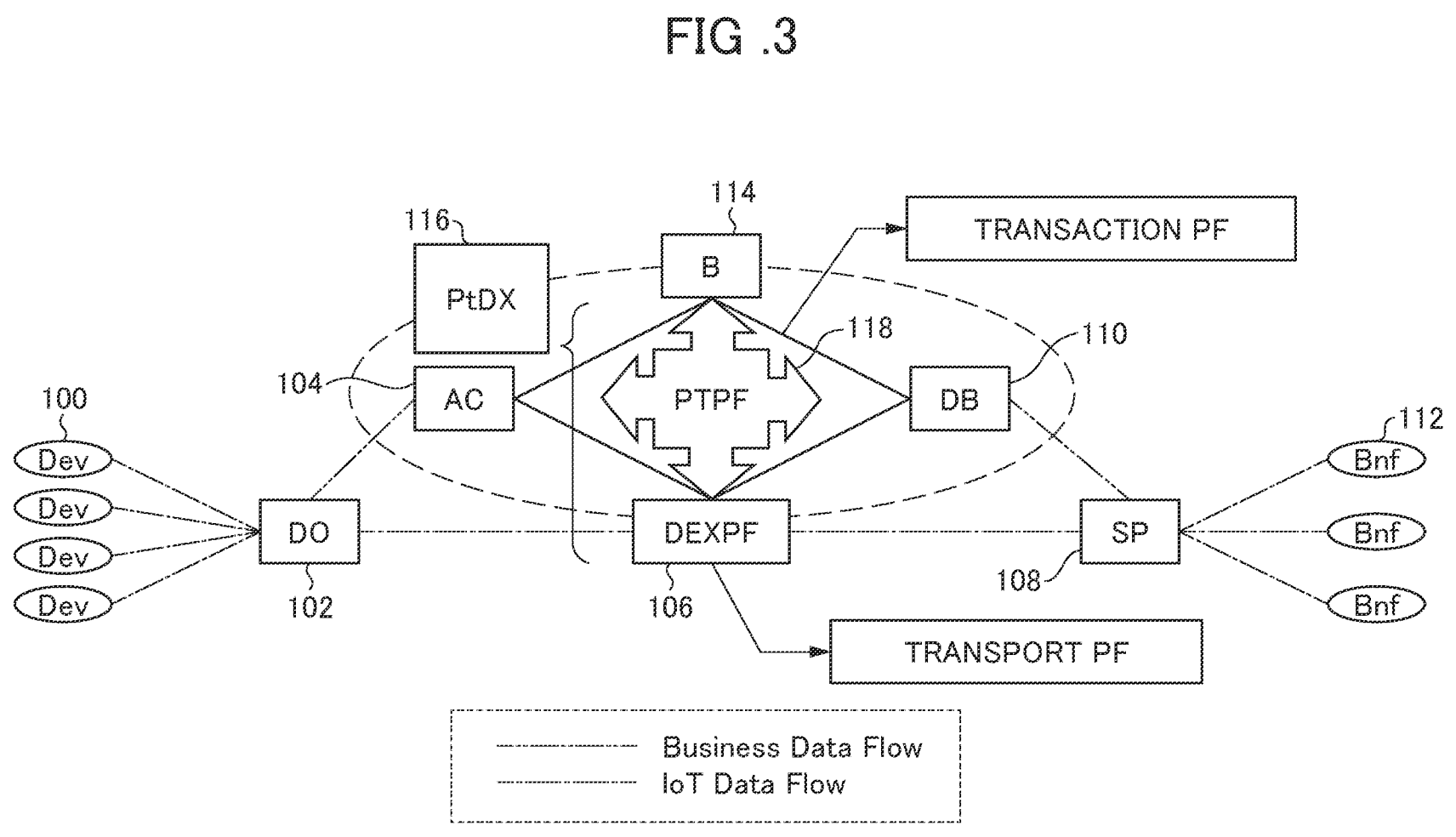

FIG. 3 illustrates a configuration of the PtDX 116 according to the present embodiment and a peripheral configuration thereof. The PtDX 116 corresponds to a preferred example of a data transaction system described in the claims. As illustrated in FIG. 3, the PtDX 116 includes the PTPF 118 and the DEXPF 106. Devices 100 are for inputting and outputting IoT data. The present embodiment will be described based on a case in which the devices 100 acquire data and the data acquired by the devices 100 is transacted. A DO 102 denotes a device operator and refers to a person (device) that controls the devices 100. The DO 102 corresponds to a preferred example of an offeror described in the claims. An AC 104 denotes an acquirer and refers to (an account of) a person who carries out a data sales offer, etc.

Regarding Accounts

For example, in a case of using Ethereum, two types of accounts can be utilized on Ethereum. One is an Externally Owned Account (hereinafter abbreviated as EOA) and the other is a Contract. The EOA is an account generated and controlled by a user. The Contract is an account generated from the EOA via a transaction. The Contract is a kind of automated agent and executes a contract code when triggered by the transaction originated from the EOA. To be brief, the Contract is something similar to an aggregate of variables and functions. Note that the functions in the present embodiment have been independently constructed by the present inventors. That is, the contract code is something similar to a function executable on Ethereum. The AC 104 of the present embodiment is, for example, the Contract mentioned above, and executes a function. In the present embodiment, the AC 104, a DB 110, and the PTPF 118 may be implemented, for example, by means of the Contract on Ethereum. The function of the present embodiment may be implemented by the above-mentioned contract code on Ethereum. The AC 104 issues a data sales offer on behalf of the DO 102. The AC 104 corresponds to a preferred example of an acquirer described in the claims.

The DEXPF 106 denotes a transport PF, and is an exchanger device for transporting data. The PTPF 118 denotes a transaction PF that does not handle the data, but conducts transactions. The DB 110 denotes a data broker that executes a data purchase offer and transacts the data. The DB 110 issues the data purchase offer on behalf of a SP 108 to be described later. The DB 110 corresponds to a preferred example of a data broker described in the claims. Like the AC 104, the DB 110 may be implemented by, for example, the Contract on Ethereum, and may execute a predetermined function. A B 114 denotes a brand. The SP 108 denotes a service provider, and is (an account of) a person who uses the data to provide a service. The SP 108 corresponds to a preferred example of a service provider described in the claims. A Bnf 112 is (an account of) a person who uses the data to conduct business.

"Bnf" of the Bnf 112 represents a beneficiary and means a recipient or a beneficiary. In FIG. 3, the two-dot chain lines indicate a data flow involved in the business (Business Data Flow). On the other hand, the chain lines indicate an IoT data flow (IoT Data Flow). FIG. 4 illustrates operations taking place in a specific transaction.

(1) First, in response to a request from the DO 102, the AC 104 issues the data sales offer on the PTPF 118. In the present embodiment, the data sales offer is specifically described as follows:

(a) Metadata description (data profile itself);
(b) Address (category);
(c) Rights information; and
(d) Others The thus-described sales offer is issued. On the PTPF 118 (i.e., a smart contract platform), the data can be sold and purchased. If conditions are met, an agreement is automatically made, and a contract is executed based on the contract conditions. Here, execution of a contract refers to implementation of two types of processing: a channel corresponding to the contract is assigned so that the data becomes available; and the settlement is made based on the conditions. The transactional data is prevented from being tampered with, and may be permanently stored on the PTPF 118. The PTPF 118 can also be regarded as an IoT data transaction platform. In the present embodiment, for example, the PTPF 118 may be configured using a DLT: Distributed Ledger Technology (Enterprise Ethereum) PF (platform). Ethereum is a trademark.

(2) Next, in response to a request from the SP 108, the DB 110 issues the purchase offer on the PTPF 118.
Specifically, the data purchase offer of the present embodiment can be described in the following manner:

(a) An ID for transaction, account information, and a price; and
(b) A Reliable credit (endorsement) of the DB 110.

The PTPF 118 automatically executes the contract if the conditions of the sales offer and those of the purchase offer are met. In FIG. 4, an ID of the DO 102 is managed by a management system (not illustrated). An ID of the SP 108 is also managed by a management system (not illustrated).

6. Processing Operation by PTPF

Figure 5:
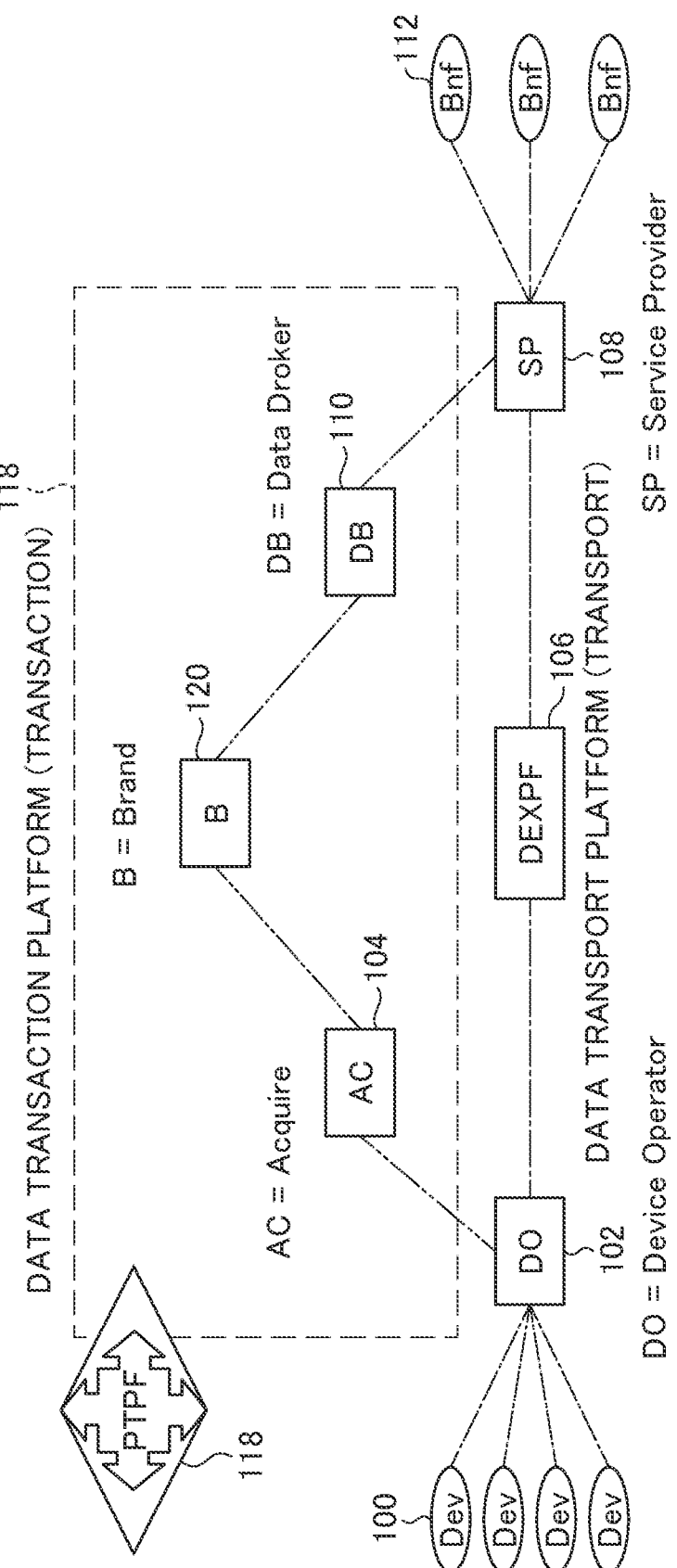
FIG. 5 is a conceptual diagram illustrating processing performed by a PTPF 118 according to the embodiment.
Figure 6:
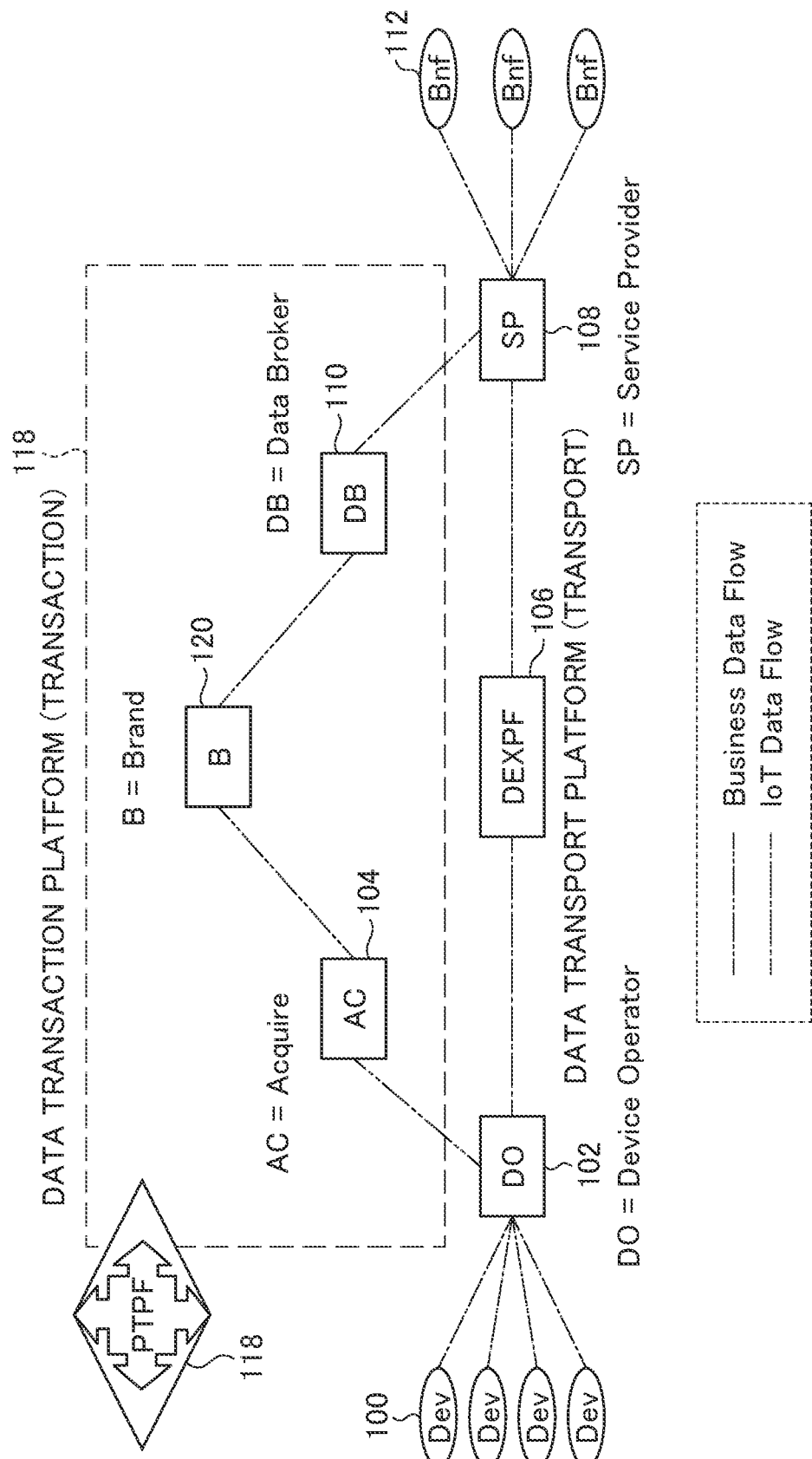
FIG. 6 is a diagram in which the data transaction part in FIG. 5 is indicated by two-dot chain lines and the data transport part in FIG. 5 is indicated by chain lines.

FIG. 5 is a conceptual diagram illustrating processing performed by the PTPF 118. The PTPF 118 is a data transaction platform (transaction) and is responsible for a transaction part of the data transaction. On the other hand, the DEXPF 106 is a data transport platform (transport), and is responsible for a transport part of the data transaction. As illustrated in FIG. 5, on the PTPF 118, the B (brand) 120 accepts the sales offer from the AC 104 and the purchase offer from the DB 110. FIG. 6 is a diagram in which the data transaction part in FIG. 5 is indicated by two-dot chain lines and the data transport part in FIG. 5 is indicated by chain lines. One of the characteristics of the present embodiment is that the transaction part is separated from the data transport part. A conventional distributed ledger can process sales offers and purchase offers, but has difficulty in handling a large amount of data, such as in the case of data transport. According to the present embodiment, both the platforms perform respective processing while taking advantage of the respective characteristics, so that the effect of the so-called division of labor is obtained.

Figure 7:
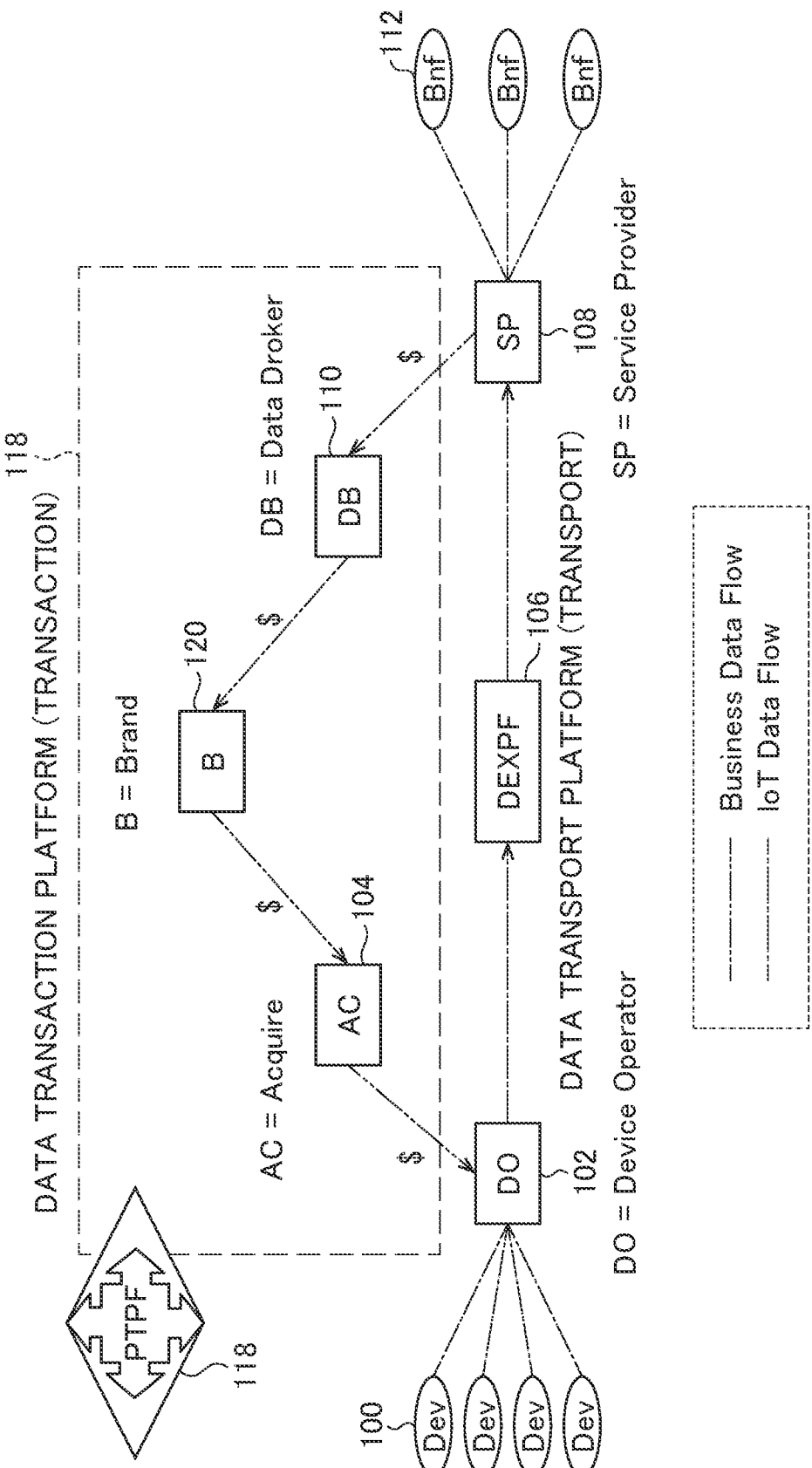
FIG. 7 illustrates a flow of price, in addition to what is illustrated in FIG. 6.

FIG. 7 is a diagram similar to FIG. 6, but additionally illustrates a flow of price. As shown in FIG. 7, the price involved in the data transaction is passed from the SP 108 to the DB 110. The price is then transmitted from the DB 110 to the B 120, within the PTPF 118. The B 120 transports the price to the AC 104 if the contract conditions are met. The AC 104 passes the price to the DO 102. In this way, the transaction part of the contract is carried out within the PTPF 118, which is the data transaction platform (transaction). The DO 102 offers the data upon receipt of the price. Note that the so-called netting can also be performed within the PTPF 118. As illustrated in FIG. 8, the netting may be directly performed between the AC 104 and the DB 110. The "netting" signifies that concerned parties calculate a difference between their amount paid and amount received, and settle the difference between the amounts such that their credit and debt offset each other. The settlement, the payment of a price, the receipt of a price, etc. within the PTPF 118 may be performed in various ways, examples of which include a payment in a virtual currency and a payment in a crypto currency. For example, if the PTPF 118 is constructed using Ethereum (trademark), the settlement may be made using Ether, which is a virtual currency.

Figure 9:
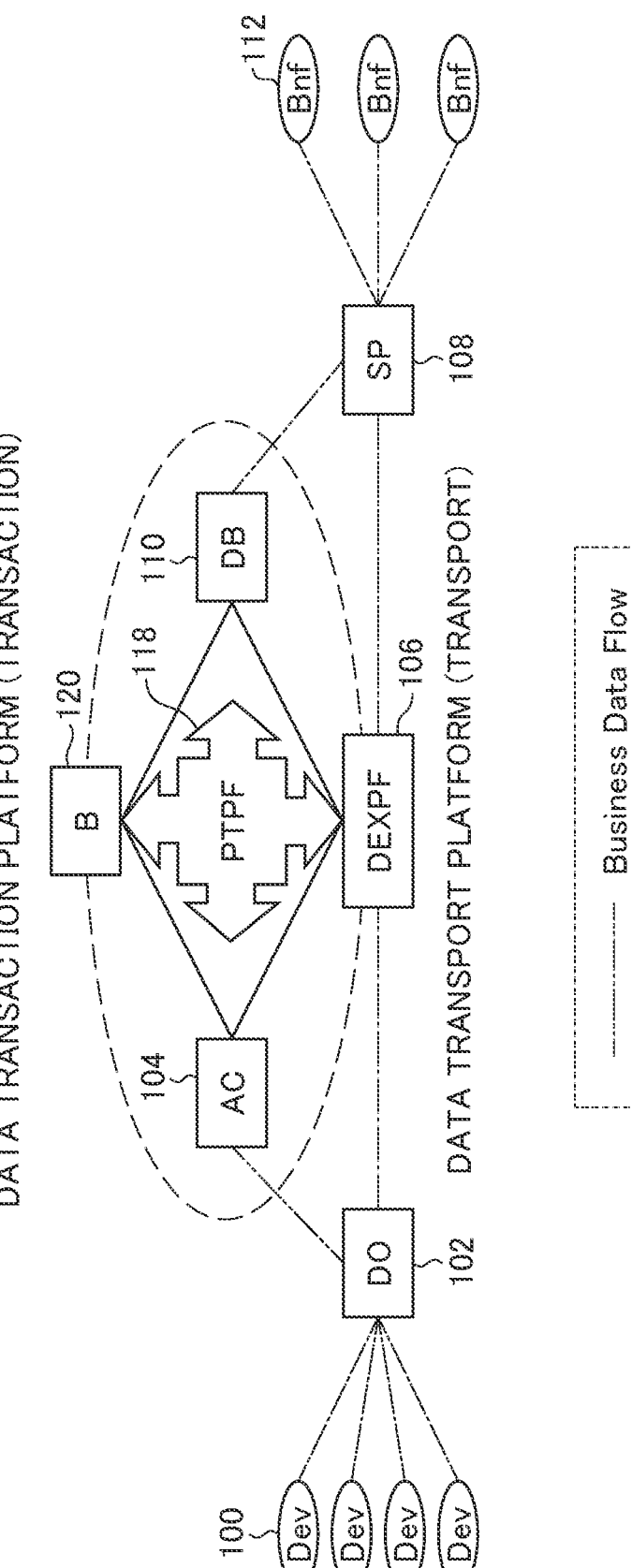
FIG. 9 is a diagram illustrating a transaction between an AC 104, a DB 110, and a B 120 carried out in the PTPF 118.

As described above, in the present embodiment, the transactions, the conclusion of contracts, the settlement, etc. can be carried out within the PTPF 118, with exception of the data transport. Consequently, as illustrated in FIG. 9, a transaction between the AC 104, the DB 110, and the B 120 can be smoothly carried out within the PTPF 118. A characteristic aspect of the present embodiment is that the contract-related platform is provided separately from the data transport platform. This aspect makes it possible to use technologies such as the distributed ledger technology, so that transactions that are secure and difficult to tamper with can be achieved. In other words, the distributed ledger technology may be used to perform one or more of the following processing operations: ensuring the integrity, management, and storage of, for example, contract contents (written contracts), various transactional documents, and settlement records.

Figure 10:
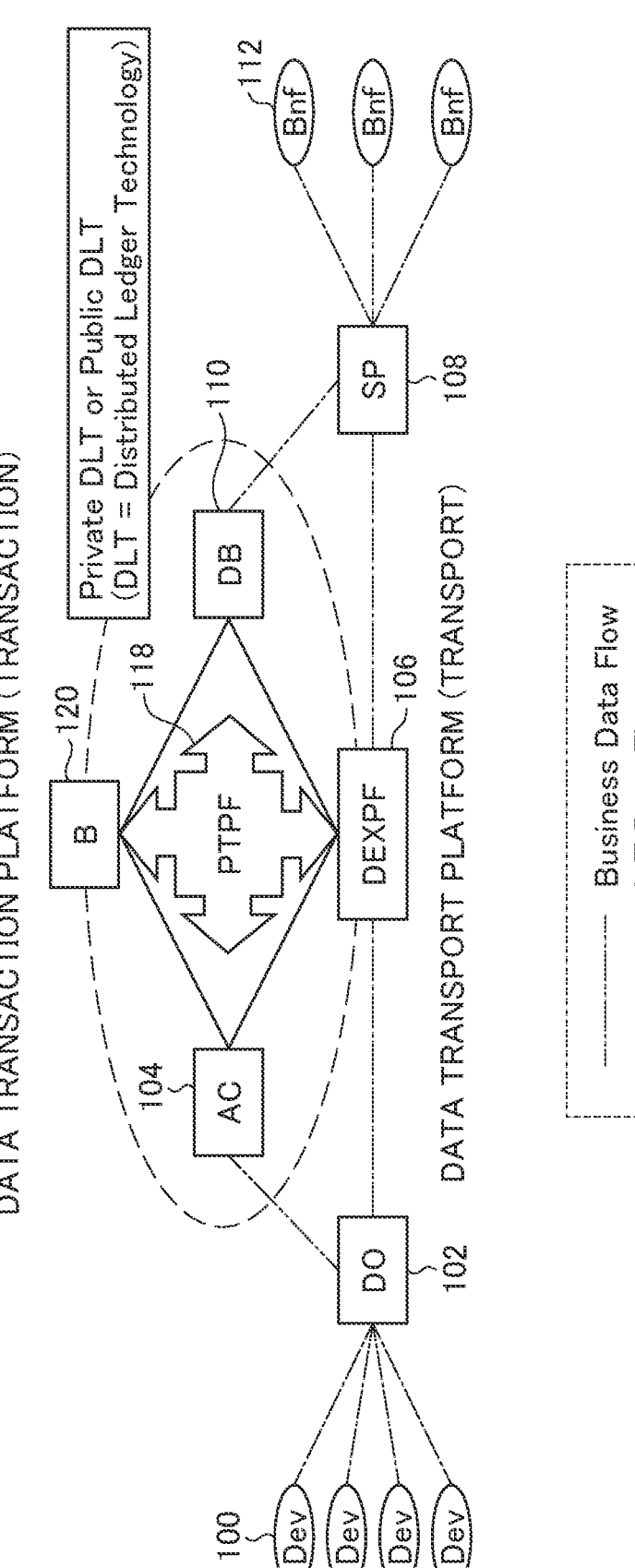
FIG. 10 is a diagram illustrating that a distributed ledger for constructing the PTPF 118 may be implemented using Private DLT or Public DLT.

The distributed ledger employed in the PTPF 118 can implemented in various ways. For example, the distributed ledger may be implemented by Private DLT or Public DLT. The distributed ledger may also be implemented using various other blockchains (such as a consortium type blockchain). FIG. 10 illustrate this feature. As illustrated in FIG. 10, the distributed ledger technology constructing the PTPF 118 may be implemented by Private DLT or Public DLT, depending on the purpose of use of the PTPF 118. Here, "DLT" refers to the distributed ledger technology. The PTPF 118 may be constructed using, for example, the system of Ethereum (trademark).

7. Actual Form

Figure 11:
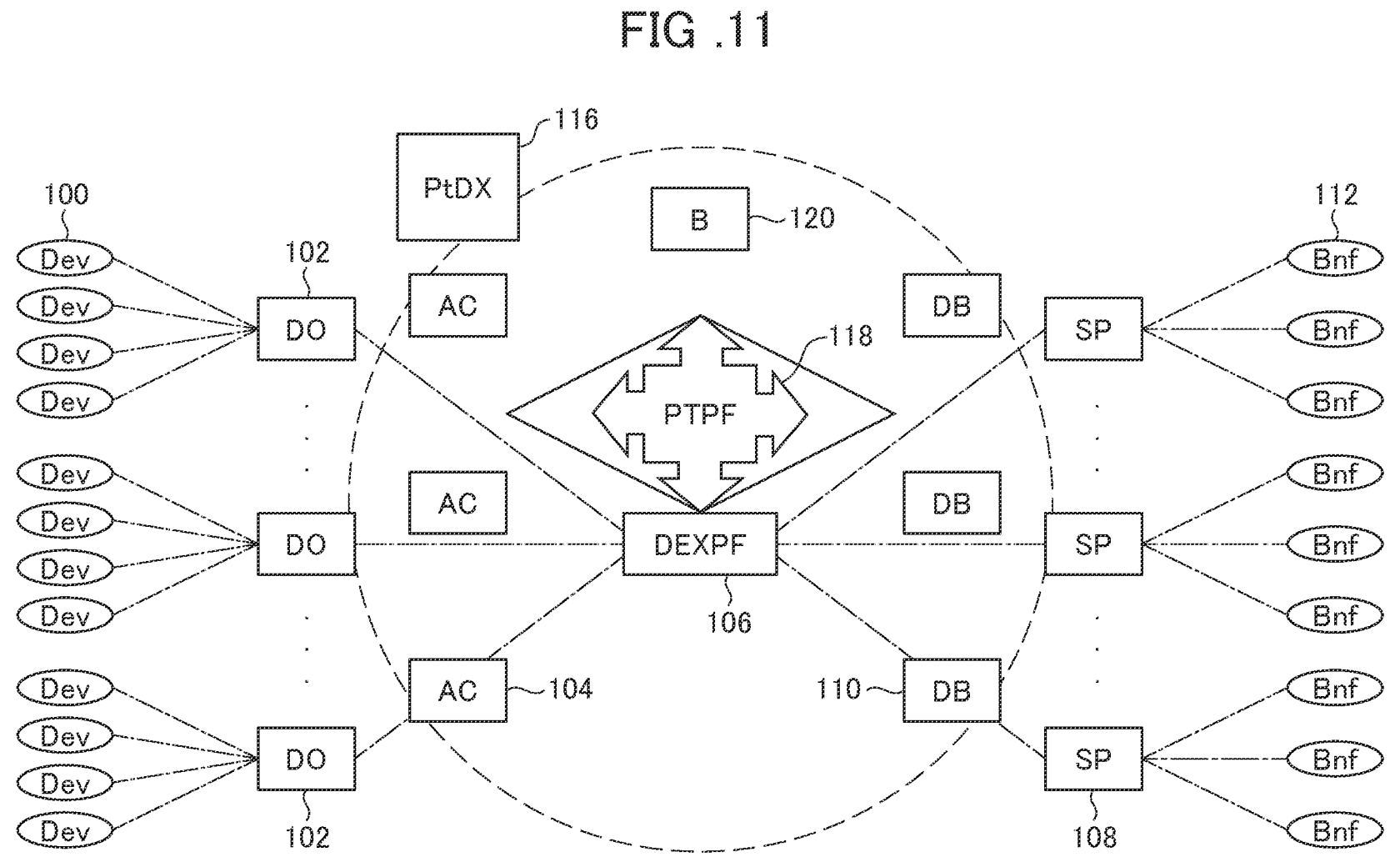

In the foregoing, the case in which one AC 104 and one DB 110 are present has been described as an example. However, two or more ACs 104 and two or more DBs 110 may be present. FIG. 11 is a diagram illustrating such an example. FIG. 11 illustrates, as an example, a case where three ACs 104 are present. The three ACs 104 may be, for example, a Tokyo branch, a Kyoto branch, and an Osaka branch of a data provider company. The Tokyo branch controls and manages a plurality of temperature sensors in Tokyo, collects data from the temperature sensors, and supplies the data to the DEXPF 106. The Kyoto branch controls and manages a plurality of temperature sensors in Kyoto, collects data from the temperature sensors, and supplies the data to the DEXPF 106. The Osaka branch controls and manages a plurality of temperature sensors in Osaka, collects data from the temperature sensors, and supplies the data to the DEXPF 106.

As illustrated in FIG. 11, in the illustrated example, three DBs 110 and three SPs 108 are present. The three SPs 108 may be, for example, Musashino City Office, Kyoto City Office, and Osaka City Office. Musashino City Office needs temperature data of Musashino City in Tokyo, and plans to use the temperature data to make a determination about heatstroke and the like. Therefore, Musashino City Office makes a request for predetermined temperature data through the DB 110. Musashino City Office obtains actual data through the DEXPF 106. Kyoto City Office needs temperature data of Kyoto City, and plans to use the temperature data to make a determination about photochemical smog and the like. Therefore, Kyoto City Office makes a request for predetermined temperature data through the DB 110. Kyoto City Office obtains actual data through the DEXPF 106. Osaka City Office needs temperature data of Osaka City, and plans to use the temperature data to predict electric power consumption. Therefore, Osaka City Office makes a request for predetermined temperature data through the DB 110. Osaka City Office obtains actual data through the DEXPF 106. As can be seen, a plurality of DOs 102 and a plurality of ACs 104 may be present. Likewise, a plurality of DBs 110 and a plurality of SPs 108 may be present. Note that in either case, the DEXPF appropriately performs switching of the data so that the data is automatically distributed to each channel.

Figure 12:
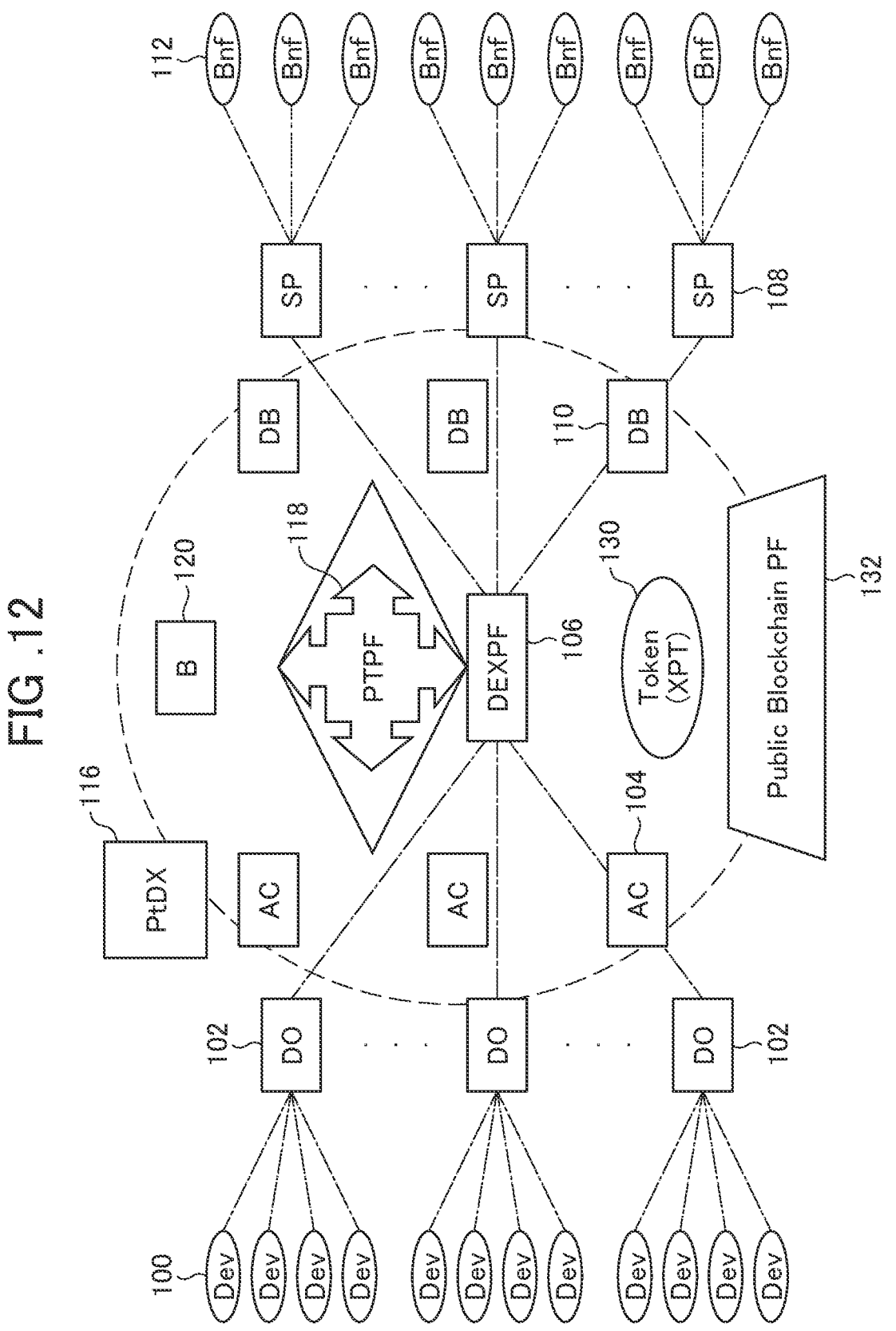
FIG. 12 is a diagram illustrating a configuration that corresponds to that of FIG. 11 and additionally includes a token 130 (XPT) and a public blockchain PF 132.

FIG. 12 illustrates a configuration corresponding to that of FIG. 11 and additionally including a token 130 (XPT) and a public blockchain PF 132. As illustrated in FIG. 12, the platform of the PTPF 118 may include various blockchains. For example, the blockchain may be a public blockchain. The price may be paid in various virtual currencies and tokens. A crypto currency called XPT may be used.

8. Configuration of DEXPF

Figure 13:
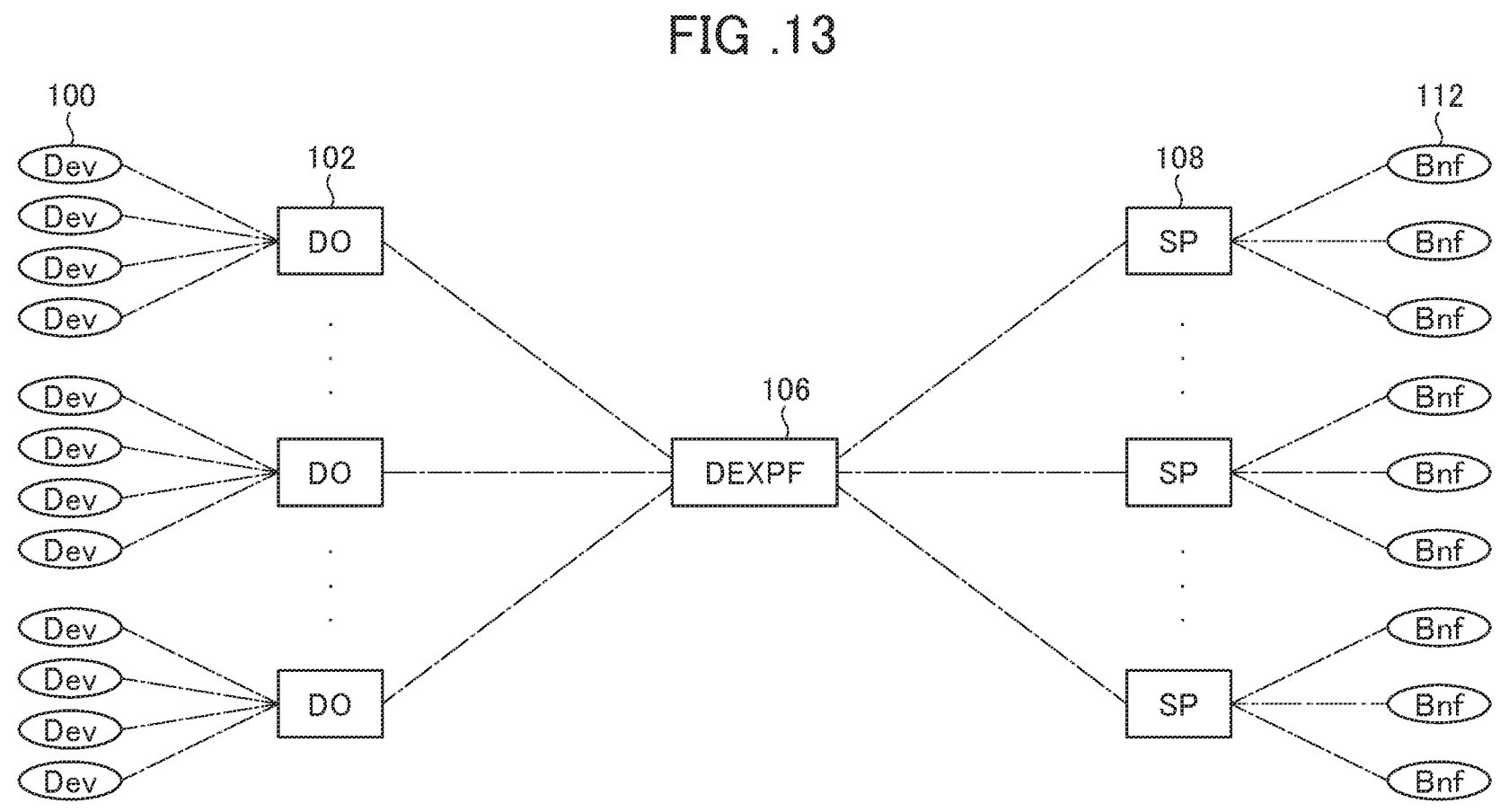

FIG. 13 is a diagram illustrating only the components connected to the DEXPF 106. As illustrated in FIG. 13, the DEXPF 106 (IoT data transport/exchange platform) serves as a kind of exchanger, and can appropriately form channels in desired routes by externally using an API. Thus, the DEXPF 106 is capable of transporting and exchanging a large amount of IoT data. The DEXPF 106 corresponds to a preferred example of a data transport unit described in the claims. As can be seen, according to the present embodiment, the platform for transporting and exchanging the IoT data is provided separately from the platform for transmitting and receiving the written contracts and the prices. As a result, a large amount of data can be transported. In contrast, if the PTPF 118 is employed for Smart Contract and data is also transported through the PTPF, it will become difficult to cope with a large amount of data. For example, in a case where a blockchain is used for management within the PTPF 118, it is expected to become very difficult to accommodate a large amount of data in the blocks of the blockchain. To address this, the present embodiment employs the data distribution type platform, which does not store data, for data transport as shown in FIG. 1, thereby making it possible to transport a large amount of data while utilizing Smart Contract.

9. Operation Examples

An operation example in a case of using the blockchain will be described with reference to the drawings. Unlike FIGS. 3 and 4 described above, FIGS. 14 to 18 are diagrams illustrating, as an example, a configuration in which two DOs 102 and two SPs 108 are present. In the following, the operation example is described with reference to these diagrams.

Figure 14:
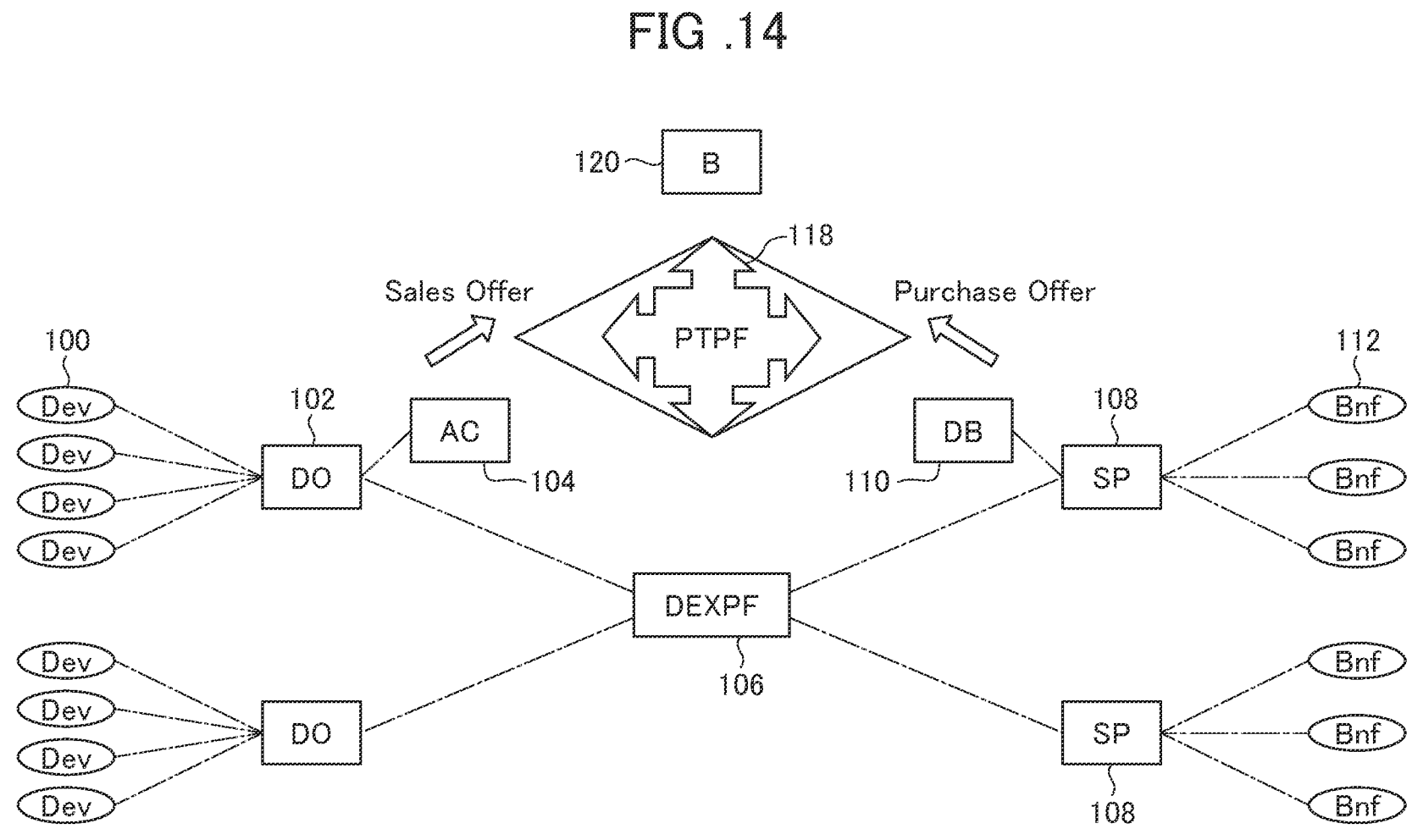
Figure 15:
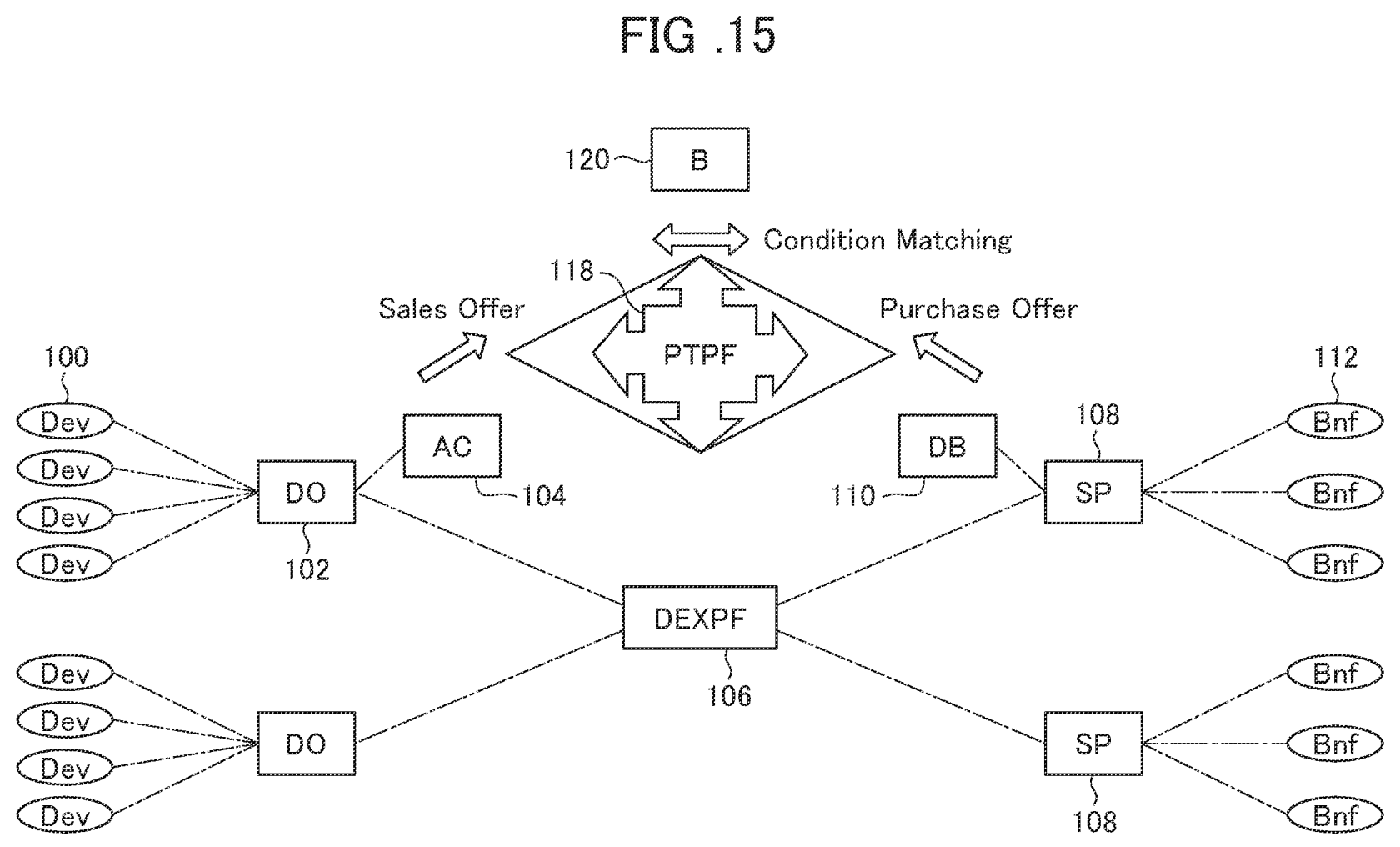
Figure 16:
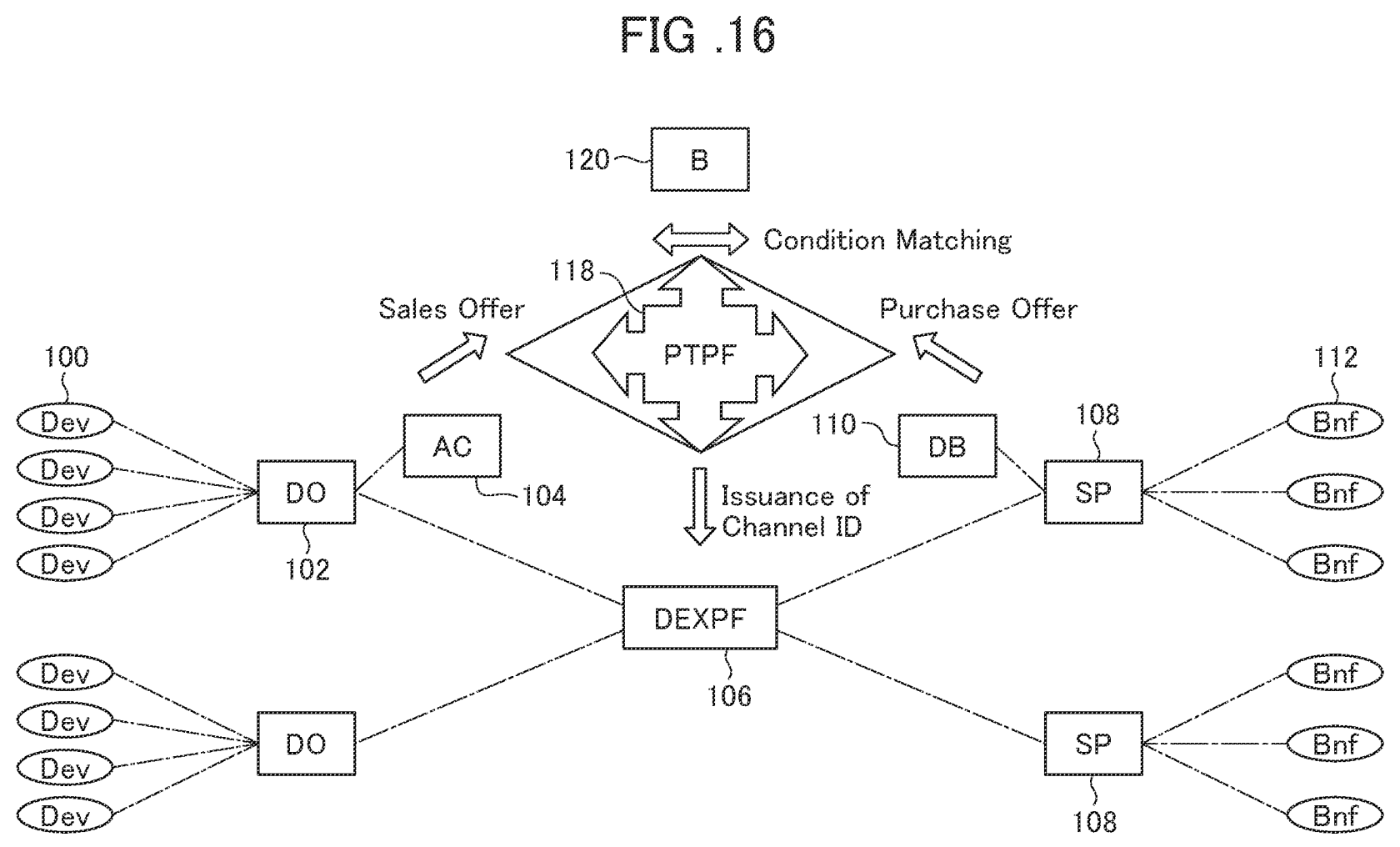

In FIG. 14, the AC 104 issues a sales offer. The DB 110 issues a purchase offer. In FIG. 15, the PTPF 118 performs condition matching. In FIG. 16, upon a positive result of the condition matching, the PTPF 118 issues a channel ID and supplies it to the DEXPF 106. Specifically, an application for setting a channel is started for the DEXPF 106. An API for issuing the channel ID to the DEXPF 106 is then operated by the application.

Figure 17:
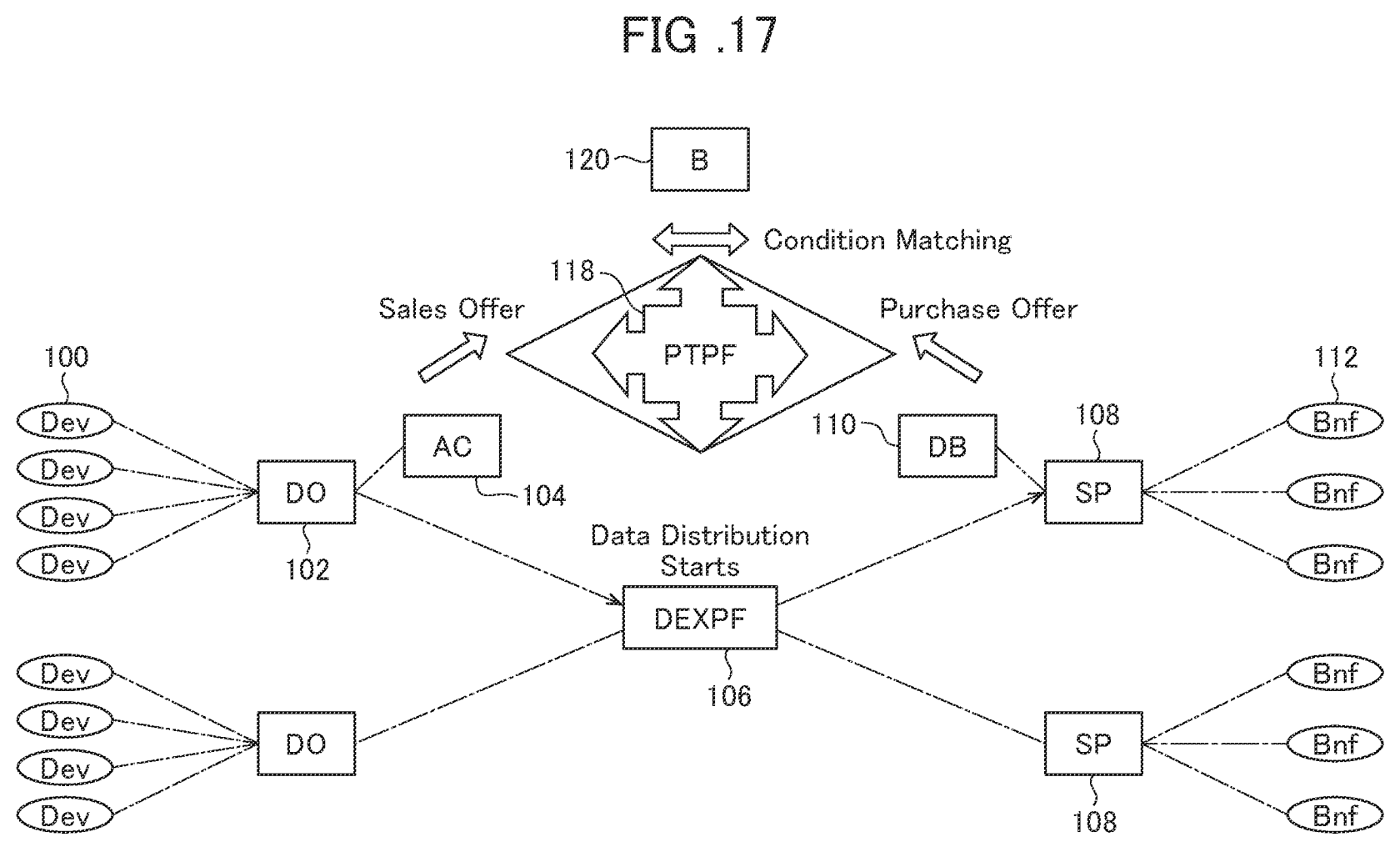
Figure 18:
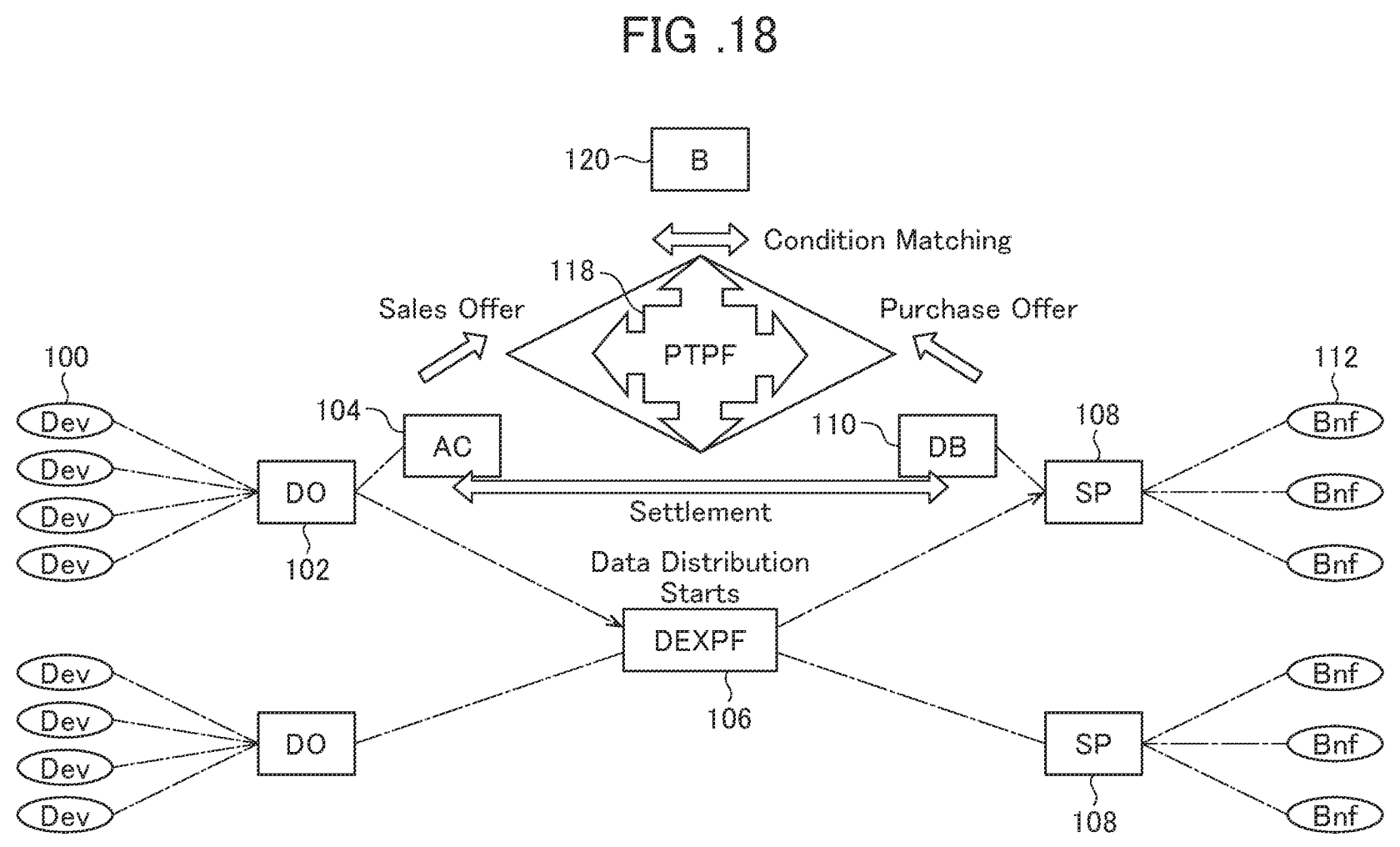

In FIG. 17, since the channel has been set, the DEXPF 106 starts data distribution. In FIG. 18, settlement is made between the AC 104 and the DB 110. The settlement may be made in a virtual currency, in a crypto currency, or in any other way. In this manner, the PTPF 118 and the DEXPF 106 are used to carry out the part related to contracts and settlement and the part related to data communication, respectively, so that business can be developed with efficiency.

10. Technical Features

As described above, the present embodiment has various technical features. In the following, the technical features will be described.

(1) Two-Layer Structure

As described above, in the PtDX 116 of the present embodiment, a data plane (high-speed path) for transporting the IoT data is separated from a control plane (low-speed path) for metadata including the transactions. FIG. 19 is a conceptual diagram illustrating this feature. The above-described PTPF 118 that carries out metadata communication such as the transactions and the DEXPF 106 that carries out the IoT data communication form a two-layer structure. That is, the PTPF 118 is the control plane and the DEXPF 106 is the data plane. Therefore, this configuration achieves not only data communication including, for example, high-speed communication, intermittent communication, bulk communication, and atypical communication, but also low-speed aperiodic data transport.

(2) Separation of Public Plane from Closed Plane

Figure 20:
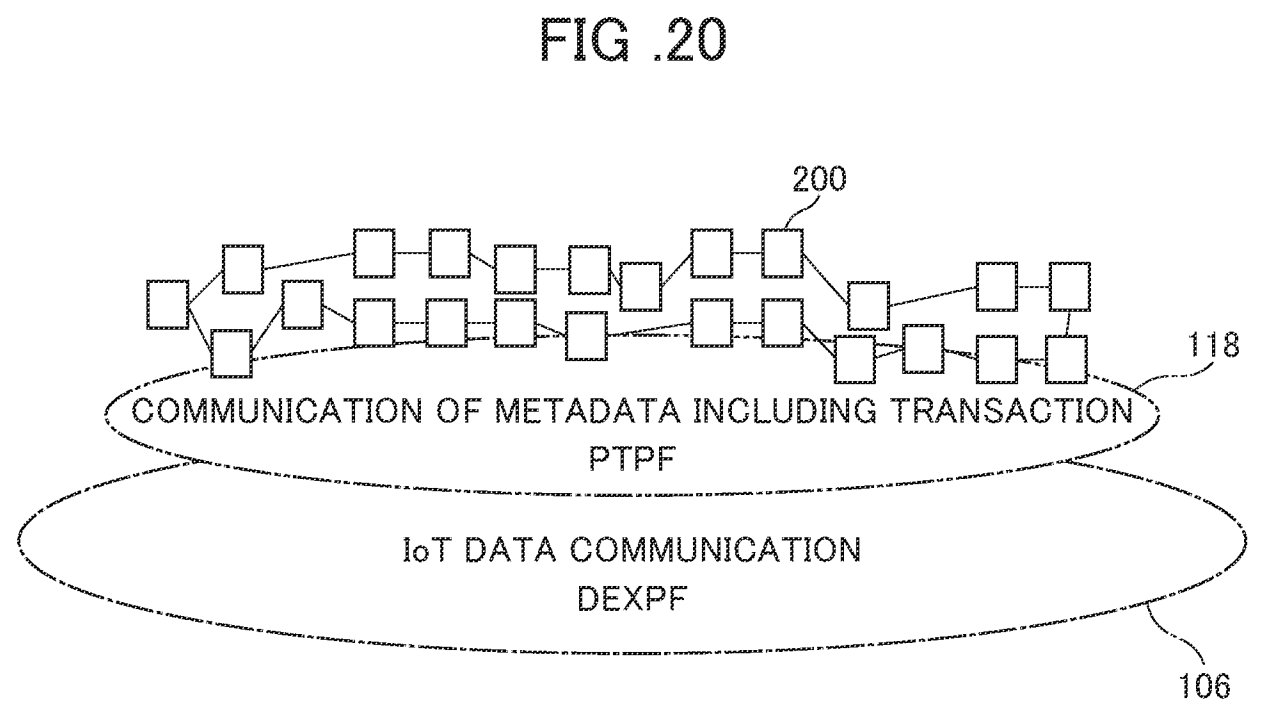

The metadata of the control plane is built in a public domain of a blockchain, so that third-party's viewing and licensing uniqueness are ensured. FIG. 20 is a conceptual diagram illustrating this feature. Placing the metadata on a public blockchain leads to creation of circumstances in which all the participants are allowed to refer to the data, while the data cannot be tampered with, but can be altered only by a legitimate authorized person, thereby making it possible to achieve circumstances in which one can use the data only under associated conditions. In other words, in the PTPF 118, the public blockchain is used to exhibit various items of rights information (i.e., to enable the items to be viewed by anyone). The term "public" refer to a state in which anyone who joins the blockchain can view information. Here, the term "metadata" refers to information classes, definition of license, rights information, etc.

(3) Superimposing Data Processing by Subroutine

Figure 21:
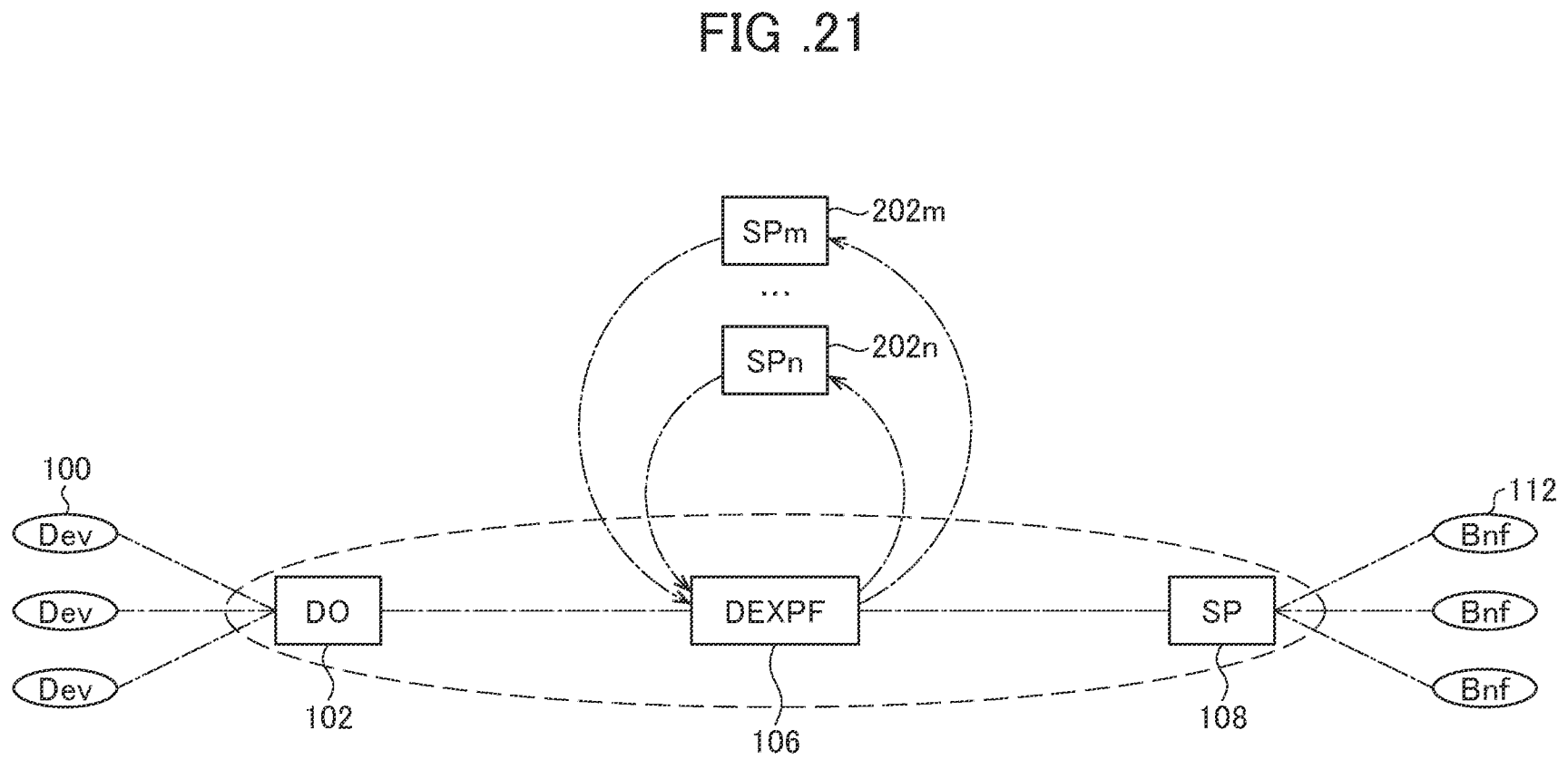

Recursive processing is enabled by placing an outlet of the data into a subroutine and causing the subroutine to process the data, and by inputting the processed data as input data into the DEXPF 106. Specifically, data outputted from the DEXPF 106 is provided to subroutines 202$n$ to 202$m$ that are connected to the outlet of the DEXPF 106. The data outputted from the subroutines 202*n* to 202*m* is used as input data for the DEXPF 106. That is, the subroutines 202*n* to 202*m* provide the processed data to the input of the DEXPF 106. This feature makes it possible to perform the recursive processing. FIG. 21 is a diagram illustrating the subroutines 202*n* to 202*m*. Here, n and m are natural numbers. Thus, data conversion and multiplexed data processing can be performed. Data format conversion, intelligent processing, and the like can be performed. The subroutines 202*n* to 202*m* correspond to preferable examples of a subroutine unit described in the claims.

(4) Master Brand Settlement

Figure 22:
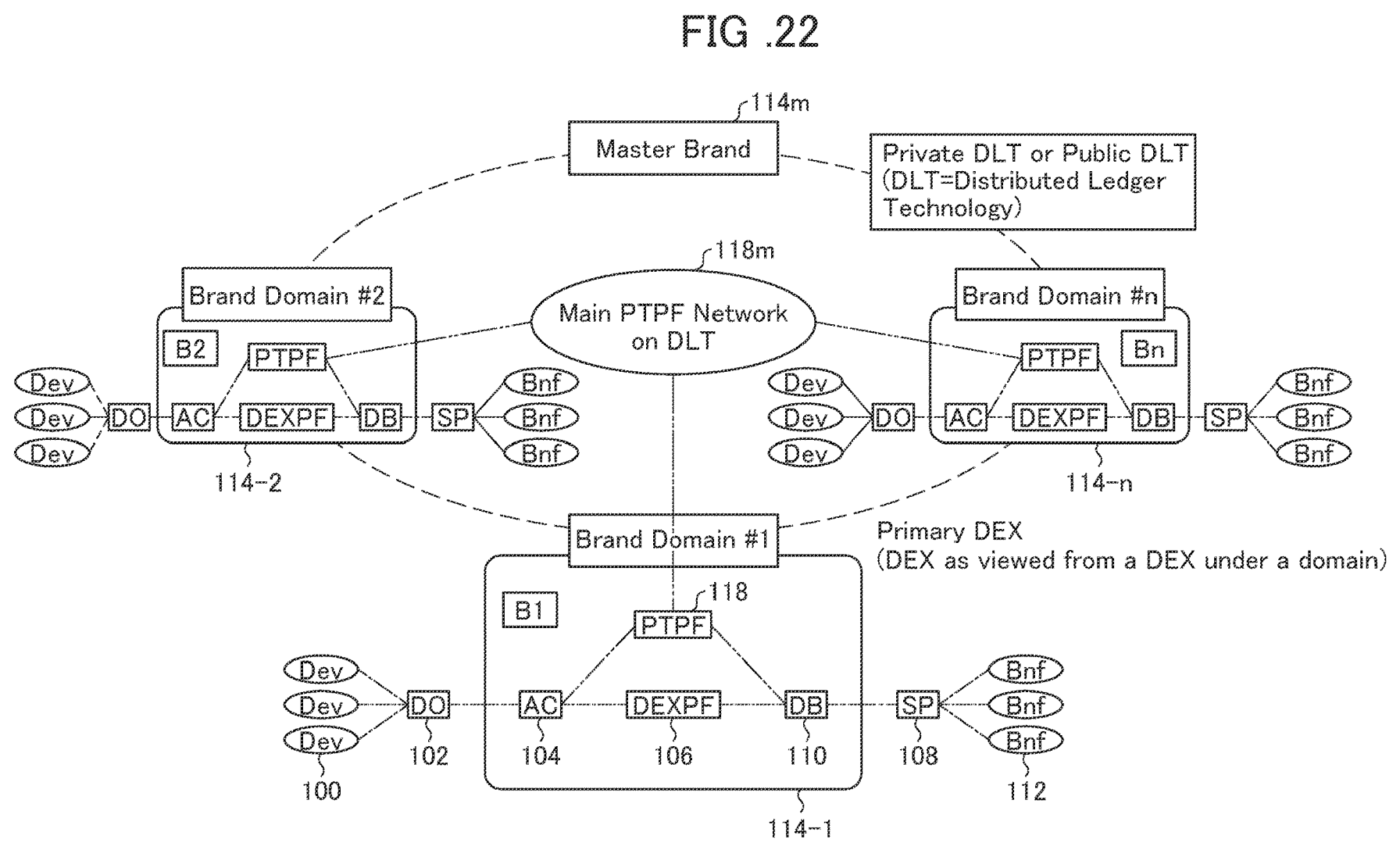

A main PTPF network 118*m* makes cross-domain settlement between brands arranged within one brand (i.e., under the master brand). FIG. 22 illustrates this feature. As illustrated in FIG. 22, the main PTPF network 118*m* has a plurality of brand domains arranged thereunder. Each of the domains includes therein a data transaction system (brand B1) including the PTPF 118 and the DEXPF 106 described above. In the example illustrated in FIG. 22, three types of brands are arranged. However, the number of the brands is not limited. A DEX (Data Exchange) as viewed from a DEX (Data Exchange) under the domain is called the primary DEX. That is, the upper PTPF 118*m* is provided with respect to the PTPFs 118 described in the above embodiment so that transactions are enabled between the plurality of PTPFs 118 (via the upper PTPF 118*m*). The main PTPF network 118*m* corresponds to a preferred example of a main data transaction unit described in the claim.

(5) Placement of Public Key of DeID on Blockchain

A public key associated with a DeID (device ID) is placed on the blockchain, so that a private key of the Dev (device) remains secret regardless of whichever stage at which the DeID is embedded into the device, and the DEX (Data Exchange) can use information that cannot be tampered with and can be referenced. FIG. 23 illustrates this feature. Writing of the device ID is carried out in the hatched portions.

Case 1 illustrated in FIG. 23 is an example in which a DP 302 writes a DeID onto a device and delivers the device to a DO 102. Specifically, a DM (Device Manufacture) 300 creates the device and passes it to the DP (Device Provider) 302. The DP 302 writes the DeID onto the device, and then, passes the device to the DO 102. Case 2 illustrated in FIG. 23 is an example in which the DM 300 writes a DeID onto a device, and then, delivers the device to the DP 302 or the DO 102. Specifically, after writing the DeID onto the device, the DM (Device Manufacture) 300 passes the device to the DP (Device Provider) 302 or the DO (Device Operator) 102. In Case 3 illustrated in FIG. 23, after writing a DeID onto a device, the DO 102 deploys the device. In the present embodiment, since the public key is placed (stored) on the blockchain, any of the above cases can be employed.

10. "PD Exchange" as Specific Example of DEXPF 106

As the DEXPF 106, which is one of the characteristic components of the present embodiment, various transport systems can be used. For example, "PD Exchange", which is a product of the present Applicant, can be used as the DEXPF 106, without having to be modified. In the following, PD Exchange will be described. PD Exchange includes a data exchange server software and a cloud service that are specialized in "data aggregation from IoT devices" and "command transmission to IoT devices", which are common functions related to development of IoT applications.

Role of PD Exchange

PD Exchange has a flexible distribution function. For example, PD Exchange can distribute data of "temperature" and data of "humidity" that have been simultaneously received, separately to different applications. PD Exchange also can deliver only the "temperature" data to one of the applications, and both of the "temperature" data and "humidity" data to the other. That is, PD Exchange is capable of distributing the data.

Product Configuration of PD Exchange

API Connect (Open Platform)

PD Exchange can be operated with REST API. It is possible to use not only a request-response type API with which an application having good compatibility with existing networks is developed, but also a real-time API that delivers data in real time.

Two-Way Channel (Bidirectional Communication)

In some cases, it is impossible to take full advantage of the value of the IoT data by simply transmitting the data. PD Exchange allows bidirectional communication with which a command from an application is transmitted to an IoT device.

Robust Security

PD Exchange implements countermeasures against eavesdropping by encrypting the data transmission-reception paths using SSL/TSS. PD Exchange also supports countermeasures against data tampering by using message digest. Data is exchanged on PD Exchange, and is completely discarded at the expiration of a certain period of time. That is, PD Exchange is not intended for data accumulation.

Recording and Analysis

A user can obtain a usage report as soon as he/she starts to use the PD Exchange's services. Data included in the usage report and the usage report itself can be downloaded in a legacy format such as CSV. In addition, it is possible to acquire data using an administrative API.

Cost Saving (for Valuable Development)

The user can reduce the time until the start of use of PD Exchange, the number of man-hours needed to develop applications, the costs related to facilities, and the operational resources after service launch, thereby enabling creation of value and benefit for IoT business.

Anywhere (Applicability to Cloud and On-Premise)

PD Exchange can be installed and used in IaaS such as public cloud services and on-premise systems. PD Exchange can also be provided as an infrastructure system.

Architecture

Figure 24:
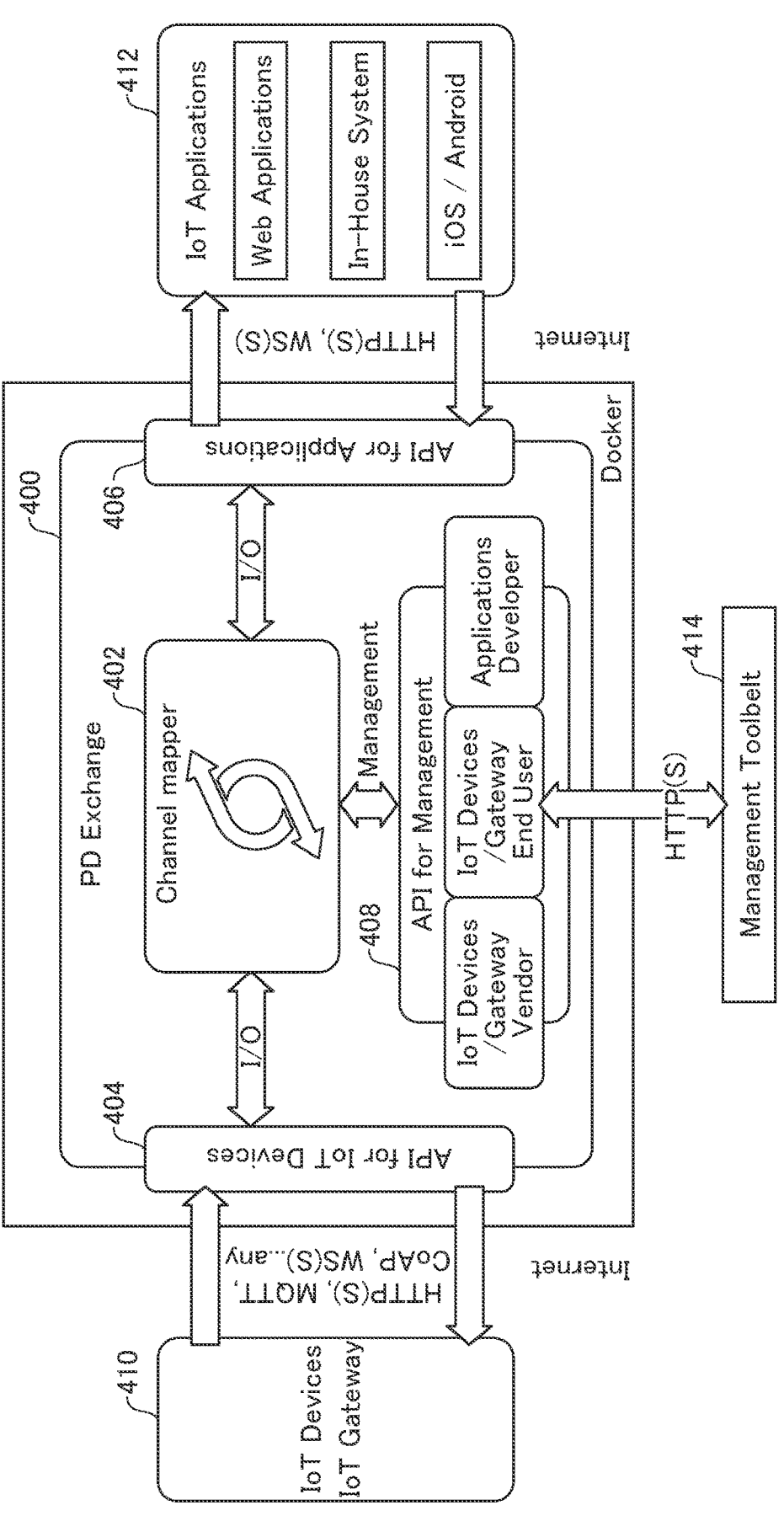
FIG. 24 is a diagram illustrating a PD Exchange 400.

Next, an architecture (configuration) of a PD Exchange 400 will be described with reference to the drawings. FIG. 24 is diagram illustrating the configuration of the PD Exchange 400. As shown in this figure, the PD Exchange 400 includes a channel mapper 402 for assigning channels for transporting data, an API 404 for IoT devices that is an API associated with IoT devices, an API 406 for IoT applications that is an API associated with IoT applications, and an API 408 for IoT management that is an API for controlling the PD Exchange 400. As mentioned above, the channel mapper 402 sets a channel for IoT data in response to external control, and transports predetermined IoT data to a designated address. The API 404 for IoT devices is an API that receives IoT data transmitted from IoT devices 410. The IoT devices 410 may be an IoT gateway. The API 406 for IoT applications is an API associated with IoT applications 412. IoT applications 412 receive IoT data using the API 406 for IoT applications. The API 408 for IoT management is an API for externally controlling the PD Exchange 400. In the example illustrated in FIG. 24, a management toolbelt 414 controls the PD Exchange 400 using the API 408 for IoT management.

Characteristic Technology of PD Exchange 400 DeID

A characteristic feature of the PD Exchange 400 is a DeID. The DeID serves as a unit based on which the IoT device is identified on the PD Exchange 400. Although the format is unique to the PD Exchange 400, it is compatible with UUIDv4, and can maintain high affinity with other IoT systems. The DeID is divided into a prefix part and a suffix part. The prefix part is managed by the PD Exchange 400. On the other hand, the suffix part can be set uniquely independently from the PD Exchange 400, and can be managed like an IP address (a network part and a host part).

Channel

The PD Exchange 400 controls the flow of the IoT data based on the concept of channel. This feature makes it possible to reduce the time until the start of use, the number of man-hours needed to develop applications, the cost related to facilities, the operation resources after service launch, etc., in comparison with conventional techniques. As a result, the PD Exchange 400 advantageously creates value and profit for IoT business.

Anonymity of DeID

Access from applications is allowed only when the channel ID is used, and the DeID is not directly exposed to the applications. Although this configuration apparently seems inconvenient, it can make it less likely for the device IDs to be leaked to the applications. In this way, it is possible to reduce the likelihood of the leakage of the device IDs to the applications on the anonymized systems. Identifying the ID is synonymous with being allowed to operate the device. Anonymizing the DeIDs also advantageously reduces the cost for storing sensitive information, the cost being incurred at the application side.

Specialization in Data Exchange

The PD Exchange 400 is not intended for data accumulation. The PD Exchange 400 carries out temporary storage to wait for data acquisition, but does not provide a function of permanently storing data. Further, unlike the so-called "queue", data is deleted only after a temporary storage period has elapsed. With this configuration, the data acquisition side is required to perform subscription management (management of a read-though part), but instead, it is possible to perform reading independently from two or more applications, so that the applications can be reduced in size.

Docker

The PD Exchange 400 operates in Docker. Containerization of operating environments enables system operation to be carried out in the same or similar environment, from physical servers to IaaS. The PD Exchange 400 can also be applied to a case where at the time of startup, an extra physical server is used, followed by gradual shift to IaaS. Even in this case, migration can be carried out without changing codes related to the operating environments. Further, upgrading can also be more fully controlled by way of updating of Docker image by a docker pull command.

Introduction Types of PD Exchange 400

Two introduction types of the PD Exchange 400 are available. Specifically, according to the purpose/application of a system/solution to be constructed using the PD Exchange 400, a user can select a more suitable one from the two types of the PD Exchange 400, namely a cloud (SaaS) type and an on-premises type.

The embodiment described above is not intended to limit the present invention. In the embodiment, most preferred effects of the present invention have been described. The effects exerted by the present invention are not limited to those described in the above embodiment.

EXPLANATION OF REFERENCE NUMERALS

10: PF
12: GW
14: Device
20: R
22: GW
24: Device
100: Device
102: DO
104: AC
106: DEXPF
108: SP
110: DB
112: Bnf
114: B
116: PtDX
118: PTPF
120: B
130: Token (XPT)
132: Public Blockchain PF
200: Blockchain
300: DM
302: DP
400: PD Exchange
402: Channel Mapper
404: API for IoT Devices
406: API for IoT Applications
408: API for IoT Management
410: IoT Devices
412: IoT Applications
414: Management Toolbelt

The invention claimed is:

1. A data transaction system comprising:

one or more processors, the one or more processors including a data transport platform and a distributed ledger platform, wherein the one or more processors are configured to issue a data sales offer on behalf of an offeror that intends to offer data;

issue a data purchase offer on behalf of a service provider that intends to use the data;

perform condition matching between the data sales offer and the data purchase offer;

upon a positive result of the condition matching, set a data channel on the data transport platform through which the data is transported from the offeror to the service provider;

execute a data transaction contract between the offeror and the service provider on the distributed ledger platform that is different from the data transport platform; and transmit IoT data in response to the execution of the data transaction contract on the distributed ledger platform and transmit neither the data sales offer nor the data purchase offer, wherein the data transport platform includes a first application programming interface that is associated with an IoT device and receives the IoT data from the offeror and a second application programming interface that is associated with an IoT application and sends the IoT data to the service provider, wherein the data transport platform further includes a channel mapper that sets the data channel, through which the IoT data is transported from the offeror to the service provider via the first application programming interface and the second application programming interface, and the data transport platform is configured to distribute the data without accumulating the data.

2. The data transaction system according to claim 1, wherein the distributed ledger platform uses a distributed ledger to ensure integrity of the data transaction contract and to manage the data transaction contract.

3. The data transaction system according to claim 2, wherein the distributed ledger uses a blockchain.

4. The data transaction system according to claim 2, wherein the distributed ledger uses a public blockchain.

5. The data transaction system according to claim 3, wherein a public key associated with a device for obtaining the data offered by the offeror is stored on the blockchain.

6. The data transaction system according to claim 1, wherein the one or more processors are further configured to:

process output data of the data transport platform and to supply the processed output data to the first interface of the data transport platform.

7. The data transaction system according to claim 1, wherein the distributed ledger platform makes settlement in a virtual currency or a crypto currency.

8. A data transaction system comprising:

a main processor; and two or more data transaction subsystems each comprising one or more processors, the one or more processors of each of the two or more data transaction subsystems including a data transport platform and a distributed ledger platform, wherein the one or more processors of each of the two or more data transaction subsystems are configured to issue a data sales offer on behalf of an offeror that intends to offer data;

issue a data purchase offer on behalf of a service provider that intends to use the data;

perform condition matching between the data sales offer and the data purchase offer;

upon a positive result of the condition matching, set a data channel on the data transport platform through which the data is transported from the offeror to the service provider;

execute a data transaction contract between the offeror and the service provider on the distributed ledger platform that is different from the data transport platform; and transmit IoT data in response to the execution of the data transaction contract on the distributed ledger platform and transmit neither the data sales offer nor the data purchase offer, wherein the data transport platform includes a first application programming interface that is associated with an IoT device and receives the IoT data from the offeror and a second application programming interface that is associated with an IoT application and sends the IoT data to the service provider, wherein the data transport platform further includes a channel mapper that sets the data channel, through which the IoT data is transported from the offeror to the service provider via the first application programming interface and the second application programming interface, and the data transport platform is configured to distribute the data without accumulating the data, wherein the main processor is connected to the two or more data transaction subsystems and is configured to function as an upper main processor for the two or more data transaction subsystems.

* * * * *